United States Patent [19]

Takizawa

[11] 4,098,512
[45] Jul. 4, 1978

[54] PHONOGRAPH RECORD PLAYER

[75] Inventor: Kazuyuki Takizawa, Chiba, Japan

[73] Assignee: Sony Corporation, Tokyo, Japan

[21] Appl. No.: 740,317

[22] Filed: Nov. 9, 1976

[30] Foreign Application Priority Data

Nov. 10, 1975 [JP] Japan .............................. 50-135989

[51] Int. Cl.² ...................... G11B 17/06; G11B 17/08
[52] U.S. Cl. ................................ 274/15 R; 274/10 R
[58] Field of Search ...................... 274/9 R, 10 R, 15 R

[56] References Cited

U.S. PATENT DOCUMENTS

| 3,433,486 | 3/1969 | Kawaharazaki | 274/15 R |
| 3,697,087 | 10/1972 | Takahashi | 274/10 R |

Primary Examiner—Steven L. Stephan
Attorney, Agent, or Firm—Lewis H. Eslinger; Alvin Sinderbrand

[57] ABSTRACT

In a phonograph record player, an improved control mechanism is provided for effecting lead-in movement of a tone arm from an elevated rest position outside the perimeter of a turntable to a selected set-down position on a record supported by the turntable so as to commence a play operation, and for effecting a return movement of the tone arm ito its rest position upon the termination of the play operation. In such control mechanism, a main lever is made to swing by a cam follower engaging in a cam groove of a control gear to effect the lead-in and return movements upon rotation of the control gear by a drive gear rotated with the turntable. In order to prevent damage to prevent damage to the needle or stylus or to the sound grove of the phonograph record, a tone arm drive mechanism for swinging the tone arm in response to swinging of the main lever is disengaged at the commencement of a play operation to remove any restraints on the movement of the tone arm.

3 Claims, 27 Drawing Figures

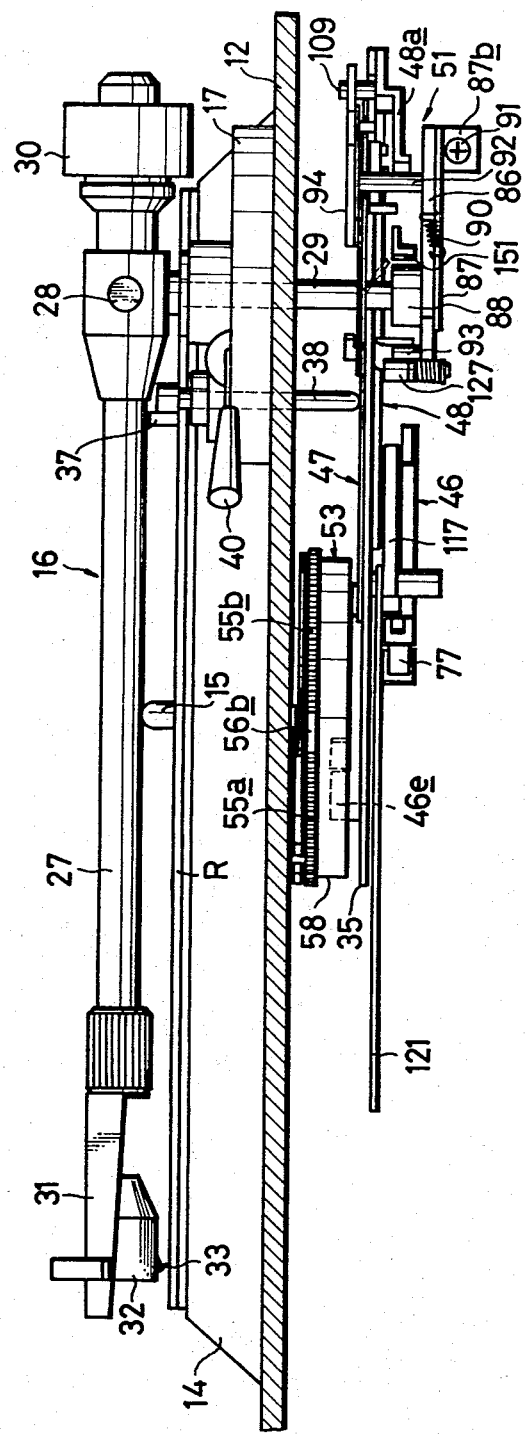

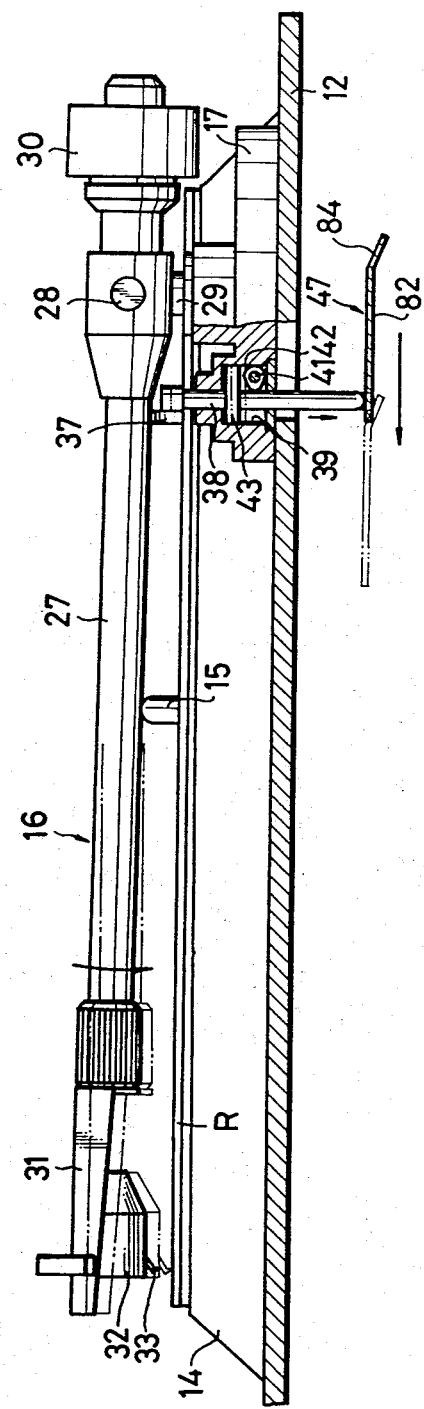

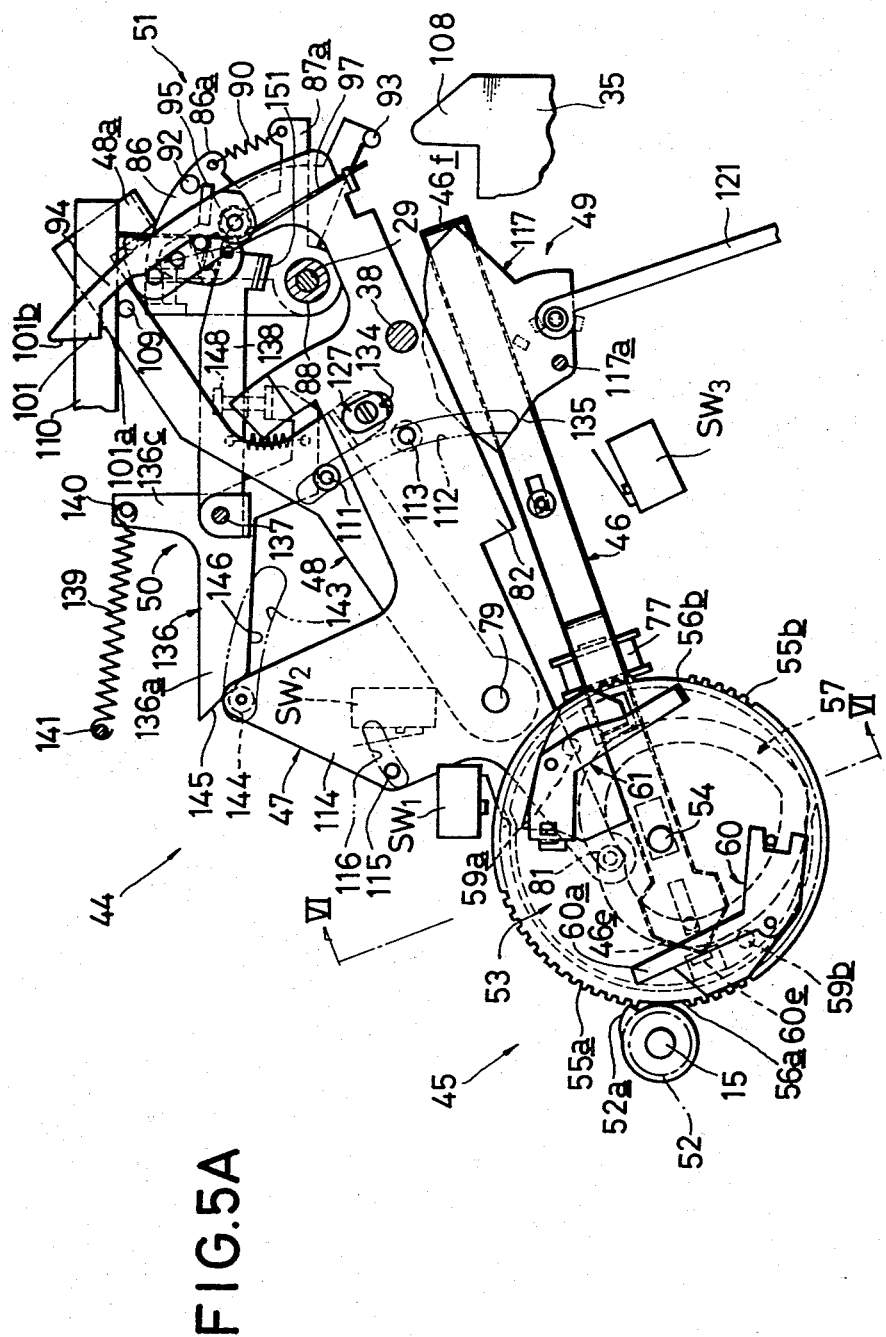

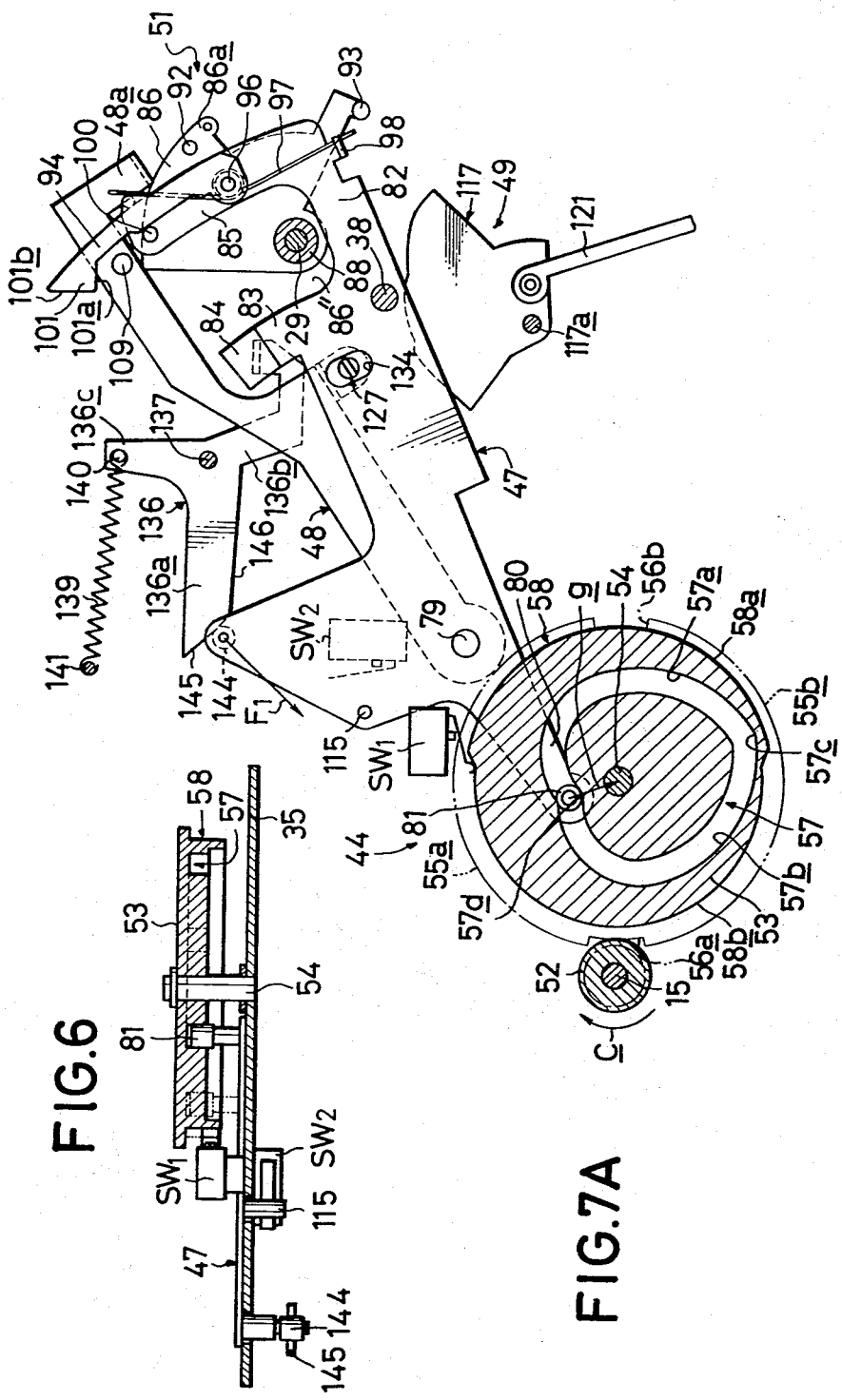

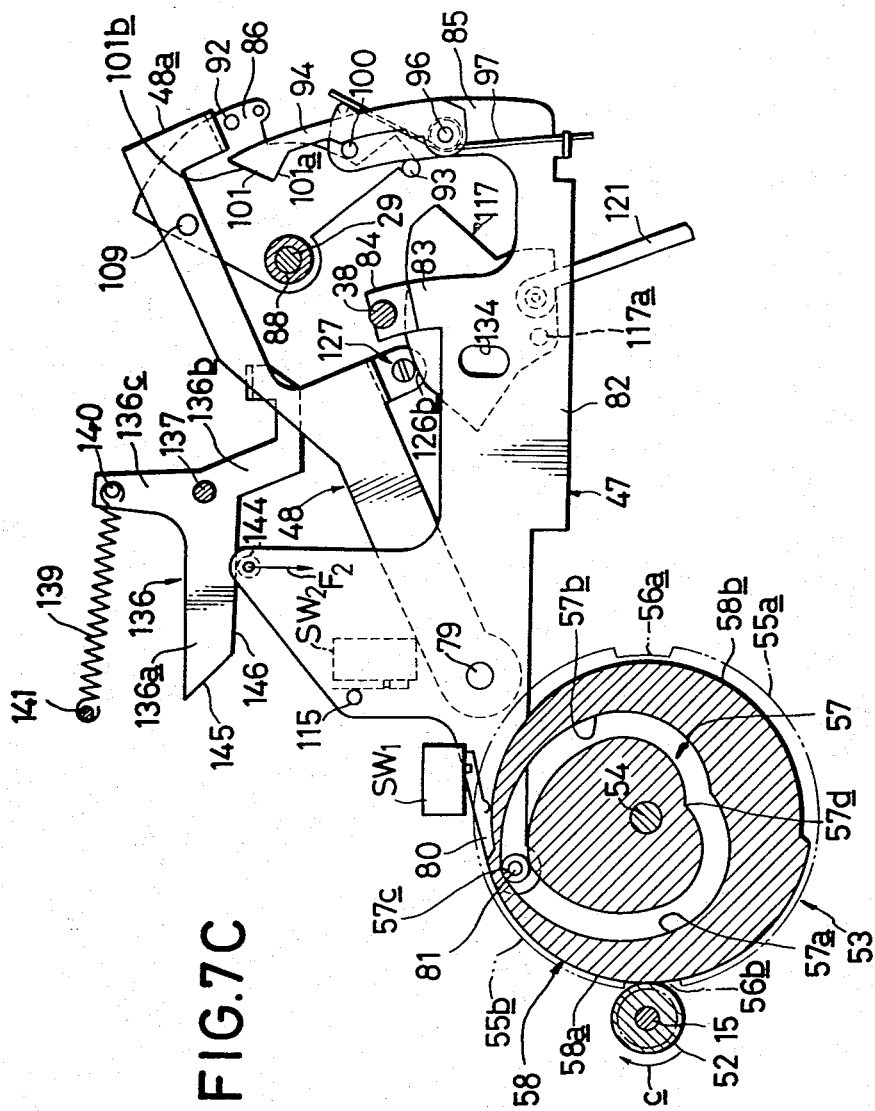

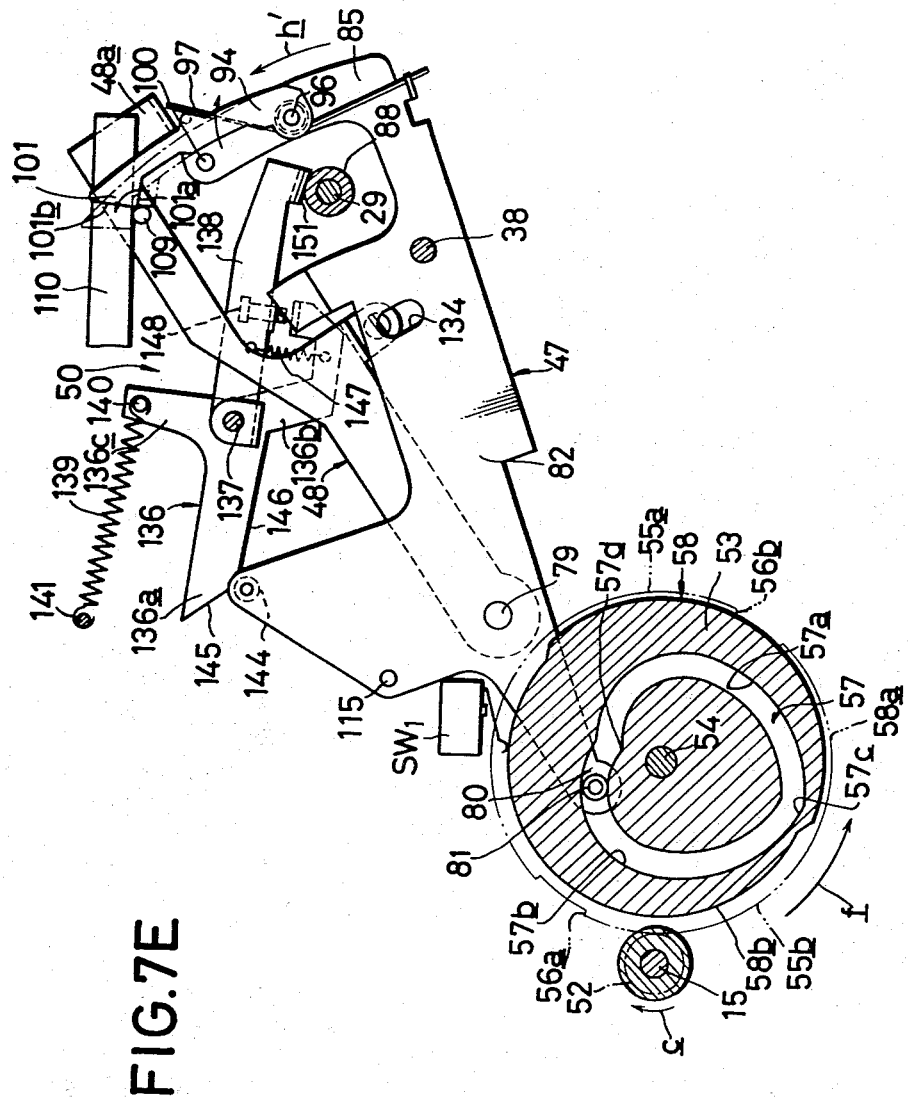

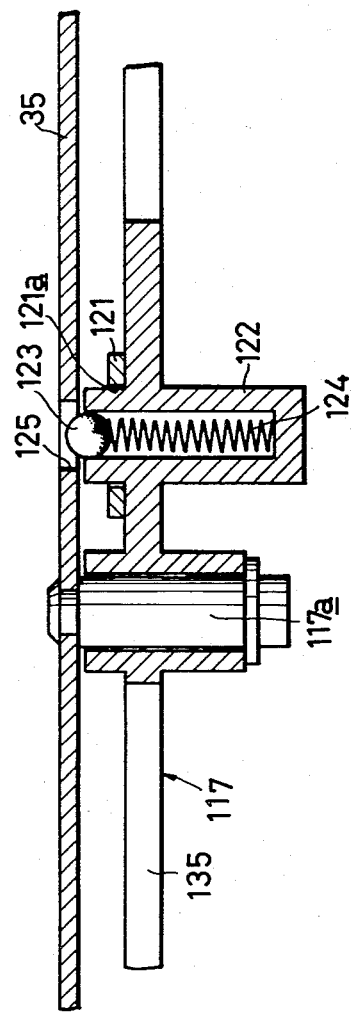

PHONOGRAPH RECORD PLAYER

BACKGROUND OF THE INVENTION

1. Field of the Invention

This invention relates generally to phonograph record players, and more particularly is directed to an improved phonograph record player control mechanism for effecting lead-in movement of a tone arm from an elevated rest position outside the perimeter of a turntable to a selected set-down position on a record supported by the turntable so as to commence a play operation, and for effecting a return movement of the tone arm to its rest position upon the termination of the play operation.

2. Description of the Prior Art

A so-called automatic phonograph record player is known in which the control mechanism thereof essentially comprises a control gear, a lever assembly turned through a predetermined angle in one direction by the control gear, a tone arm driving plate connected with the lever assembly for moving the tone arm from its rest position to a set-down position on a phonograph record supported by the turntable, a mechanism for detecting completion of a play operation, for example, as when the needle or stylus of a pickup carried by the tone arm engages the inner end of the record groove, a mechanism actuated by the detecting means for turning the lever assembly in the direction opposite to that in which the lever assembly is turned by the control gear, and means for restoring the tone arm to its rest position upon the turning of the lever assembly in such opposite direction. In a record player having a control mechanism of the foregoing type, the tone arm can be automatically brought from its rest position to a predetermined set-down position on the phonograph record for initiating a play operation and the tone arm can be automatically returned to its rest position upon termination of the play operation merely by the user's manual actuation of a start button or lever, that is, there is no need for the user to manually move the tone arm either for initiating a play operation or for returning the tone arm to its rest position at the end of a play operation. However, in the existing control mechanism, the tone arm is not completely free of restraints to its movement, particularly in the outward direction, at the commencement of a play operation. Therefore, if the sound groove of a phonograph record is somewhat eccentric so as to cause outward swinging of the tone arm when first engaged by the pickup needle or stylus at the commencement of a play operation, the restraint against such outward swinging movement of the tone arm can result in damage to the needle or stylus or to the phonograph record.

OBJECTS AND SUMMARY OF THE INVENTION

Accordingly, it is an object of this invention to provide a control mechanism for a phonograph record player which overcomes the above described problems and disadvantages associated with existing record players.

More specifically, it is an object of this invention to provide a record player control mechanism for effecting lead-in movement of a tone arm from an elevated rest position outside the perimeter of a turntable to a selected set-down position on a record supported by the turntable so as to commence a play operation, and for effecting a return movement of the tone arm to its rest position upon the termination of the play operation, and which is constructed and arranged to remove all restraints from the movement of the tone arm during the entire play operation.

Another object is to provide a record player control mechanism, as aforesaid, in which a tone arm drive mechanism is provided with transmission means which is releasable in response to predetermined resistance to swinging of the tone arm during the lead-in and/or return movements of the tone arm so as to avoid damage to the tone arm drive mechanism and to other elements of the control mechanism when there is manual interference with the automatic lead-in operation and/or the automatic return operation of the control mechanism.

Still another object is to provide a record player control mechanism, as aforesaid, in which a tone arm drive mechanism includes a transmission means which is released upon the lead-in movement of the tone arm to a selected set-down position for initiation of a play operation so that, during such play operation, the needle or stylus can freely track the record groove.

In accordance with an aspect of this invention, a record player control mechanism comprises a drive gear rotatable by the drive means which rotates the turntable, a control gear having a cam groove therein and being turned by the drive gear during the lead-in and return operations of the control mechanism, a main lever having a cam follower engaging the cam groove for effecting seinging movements of the main lever in response to the turning of the control gear, and a tone arm drive mechanism for effecting swinging of the tone arm during the lead-in and return operations in response to the corresponding swinging movements of the main lever and which includes transmission means releasable in response to predetermined resistance to swinging of the tone arm by the tone arm drive means so as to permit continued swinging movement of the main lever independently of the tone arm.

More particularly, in accordance with a feature of this invention, the tone arm drive mechanism further includes an engaging member coupled with the tone arm assembly for swinging the tone arm upon movement of such engaging member in an arcuate path, a lead-in lever pivoted for swinging movements with, and in respect to the main lever and being movable against the engaging member for moving the latter along its arcuate path upon swinging movement of the lead-in lever with the main lever in the direction for lead-in movement of the tone arm, and a return drive member on the main lever movable against the engaging member for moving the latter along its arcuate path upon swinging movement of the main lever in the direction for return movement of the tone arm. In the foregoing arrangement, the releasable transmission means preferably includes a lead-in drive member movably mounted on the main lever for movement with the latter and being engageable and disengageable with respect to the lead-in lever, and spring means yieldably urging said lead-in drive member to engage the lead-in lever for swinging movement of the latter with the main lever and being overcome by a predetermined resistance to swinging of the tone arm in the lead-in operation for disengaging the lead-in drive member from the lead-in lever.

Stop means are provided for limiting the swinging movement of the lead-in lever with the main lever during the lead-in operation of the control mechanism so as to establish the set-down position on the record, and the lead-in drive member is disengaged from the lead-in lever when such stop means halts the swinging of the lead-in lever prior to the completion of the swinging movement of the main lever. Moreover, the lead-in drive member is constructed so that, upon its disengagement from the lead-in lever, as aforesaid, the lead-in lever is turned slightly in the reverse or return direction so as to effect its separation from the engaging member coupled with the tone arm assembly for ensuring the free tracking of the record groove by the stylus at the initiation of a play operation.

In accordance with still another feature of this invention, the return drive member is movably mounted on the main lever so as to be displaced to an extended position projecting across the arcuate path of the engaging member at the end of the swinging of the main lever during a lead-in operation, whereas, at the end of the swinging movement of the main lever during a return operation, the return drive member is moved to a retracted position withdrawn from such arcuate path. A toggle spring means acts on the return drive member for yieldably holding the latter in either its extended or retracted position and is overcome by a predetermined resistance to swinging of the tone arm during the return operation for causing the engaging member to change-over the return drive member from its extended position to its retracted position.

The above, and other objects, features and advantages of this invention will be apparent in the following detailed description of illustrative embodiments thereof which is to be read in connection with the accompanying drawings.

BRIEF DESCRIPTION OF THE DRAWINGS

FIG. 3 is a side elevational view of a tone arm assembly and a control mechanism of the record player of FIGS. 1 and 2;

FIG. 4 is a side elevational view of the tone arm assembly and of an arm lifter and cueing control for the tone arm which are shown in section;

FIGS. 5A and 5B are plan views showing the control mechanism of the record player in its stop or rest condition and in its play condition, respectively;

FIG. 6 is a detail sectional view taken along the line VI—VI on FIG. 5A;

FIG. 7A–7E are plan views particularly showing a control gear, a main lever and a lead-in lever of the record player control mechanism in various positions of the control gear for illustrating the manner in which the main lever and lead-in lever are driven;

FIG. 15 is an enlarged detail sectional view of a detent assembly included in the record size selecing mechanism;

DESCRIPTION OF THE PREFERRED EMBODIMENTS

Figure 1:
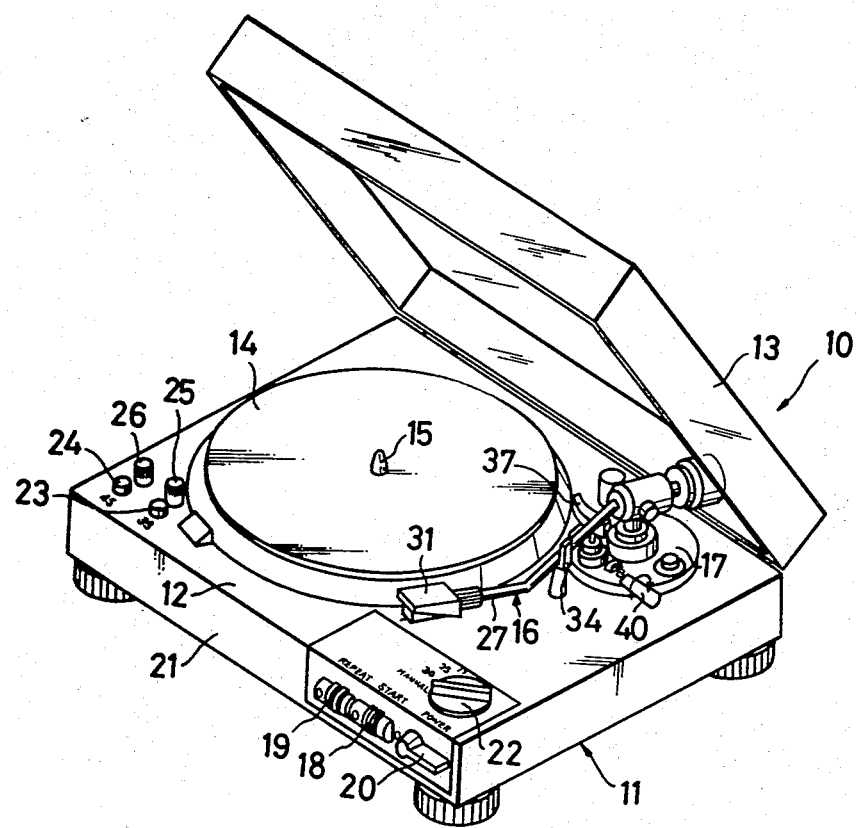
FIG. 1 is a perspective view of a phonograph record player according to this invention.

Referring to the drawings in detail, and initially to FIG. 1 thereof, it will be seen that a fully automatic record player 10 according to an embodiment of this invention is there illustrated to comprise a cabinet 11 having a deck or upper panel 12 and a pivoted dust cover 13 for enclosing a space above upper panel 12, a turntable 14 which is rotatably supported above upper panel 12 on a driving shaft or spindle 15, and a tone arm assembly 16 mounted, as hereinafter described, on a tone arm support bracket 17 which is secured to a rear portion of upper panel 12 adjacent the perimeter of turntable 14. A start-stop switch actuator 18, a repeat switch actuator 19 and a power ON-OFF switch actuator or knob 20 are mounted at a front panel 21 of cabinet 11 adjacent one side of the latter, and a record size selecting knob 22 is mounted on the front portion of upper panel 12 adjacent the same side of the cabinet as switch actuators 18-20. Switch controlling push-buttons 23 and 24 extend upwardly from the front portion of upper panel 12 adjacent the side of cabinet 11 remote from knob 22 and are selectively actuable for determining the speed of rotation of turntable 14, and knobs 25 and 26 are mounted adjacent push-buttons 23 and 24, respectively, and are selectively rotatable for effecting fine adjustment of the turntable speeds determined by selective actuation of the respective push-buttons.

As shown particularly on FIG. 3, tone arm assembly 16 conventionally includes an elongated tone arm 27 mounted adjacent one end, as by a gimbal 28, on the upper end of a vertical shaft 29 which is rotatable in suitable bearings carried by support bracket 17, a counter-weight 30 extending from the mounted end of tone arm 27, and a head-shell 31 extending from the opposite or free end of tone arm 27 to accommodate a cartridge 32 from which a stylus or needle 33 depends. By reason of the above mounting of tone arm assembly 16, tone arm 27 is capable of lateral swinging movement about the vertical axis of shaft 29 across turntable 14 and also is capable of being raised and lowered about the horizontal axis of gimbal 28 relative to turntable 14 between an elevated rest position outside the perimeter of the turntable where tone arm 27 may be disposed on an arm rest 34, as shown on FIG. 1, and an inner position, for example, as indicted in broken lines at 16' on FIG. 19 and which corresponds to the engagement of the stylus 33 of pickup 32 in the conventional final non-recorded groove portion of a record R (FIG. 3) on turntable 14.

A chassis 35 (FIGS. 2 and 3) is suitably suspended under upper panel 12 of cabinet 11, and an electric motor (FIG. 2) is mounted below a portion of chassis 35 and directly drives the driving shaft 15 on which turntable 14 is mounted. An arcuate arm lifter 37 (FIGS. 1, 3 and 4) extends under tone arm 27 in all positions of the latter and is mounted on the upper end of a vertically movable shaft 38 which is slidable in a bearing 39 (FIG. 4) formed in a portion of support bracket 17 offset forwardly from shaft 29. It will be apparent that tone arm 27 is raised and lowered, for example, between the positions shown in full and broken lines on FIG. 4, in response to vertical movements of shaft 38 and of the arm lifter 37 therewith. As will be apparent hereinafter, the record player 10 is capable of either fully automatic operation or manual operation in dependence on the positioning of record size selecting knob 22. When manual operation is selected, the vertical movements of arm lifter 37, and hence the raising and lowering of tone arm 27, may be effected by a manually actuable cueing control handle 40 (FIG. 1) which is adpated to turn a shaft 41 journalled in support bracket 17 (FIG. 4) and carrying a cam 42 disposed under an abutment 43 on shaft 38. It will be apparent that, in response to turning of shaft 41 by handle 40, cam 42 acts against abutment 43 to determine the vertical position of arm lifter 37.

Figure 2:
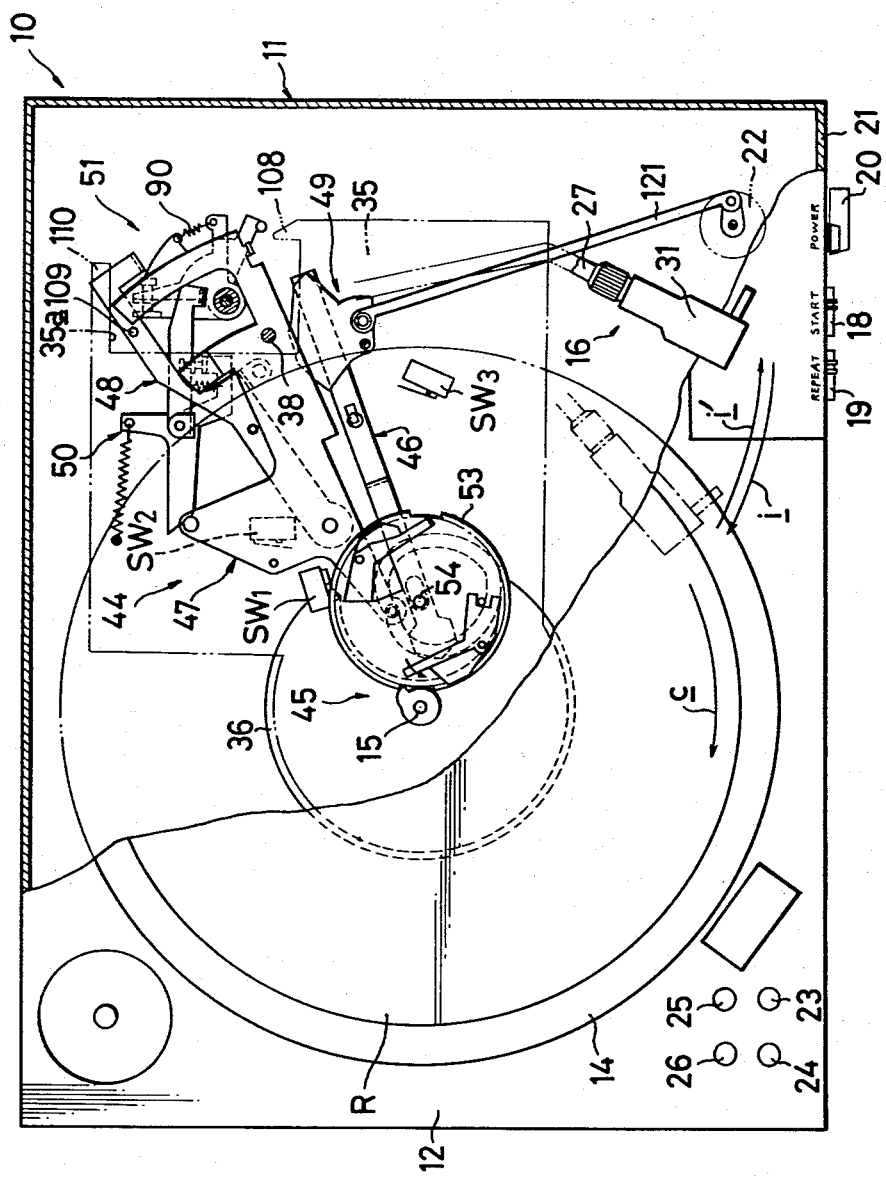
FIG. 2 is a top plan view of the record player of FIG. 1 with its turntable and an upper panel of its cabinet being partly broken away.

The illustrated record player 10 according to this invention further comprises an automatic control mechanism 44 which is shown in FIG. 2 to generally comprise a control gear assembly 45 operable from the driving shaft or spindle 15, an actuating slide 46 for initiating operations of control gear assembly 45, a main lever 47 movable in response to operation of control gear assembly 45, a lead-in lever 48 adapted to be coupled with main lever 47 for following the movement of the latter during swinging or lead-in of tone arm 27 to a predetermined start-of-play or set-down position of the stylus on a record R, a record size selecting mechanism 49 for determining such start-of-play or set-down position under the control of knob 22, and a brake mechanism 50 for frictionally braking the swinging movement of tone arm 27 during lead-in of the latter from its rest position to the predetermined set-down position and during the return swinging movement of the tone arm to its rest position. Furthermore, as shown on FIGS. 5A and 5B, automatic control mechanism 44 generally comprises a tone arm drive mechanism 51 through which the lead-in and return swinging movements of tone arm 27 are effected in response to corresponding movements of main lever 47 and lead-in lever 48.

Figure 20:
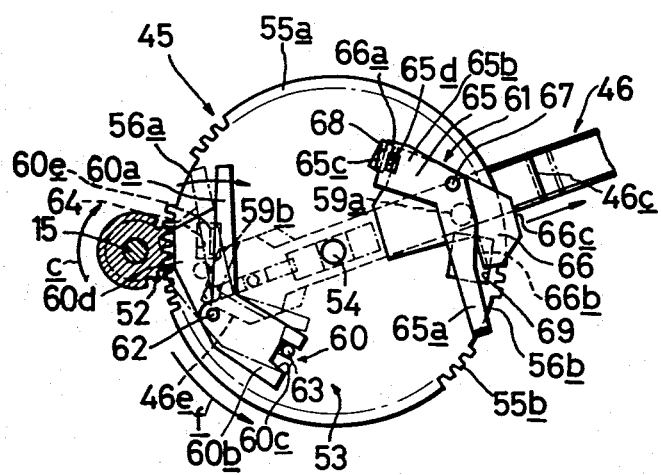
FIG. 20 is a view similar to a portion of FIGS. 18 and 19, but showing the condition of the clutches in the course of the return movement of the control gear.
Figure 21:
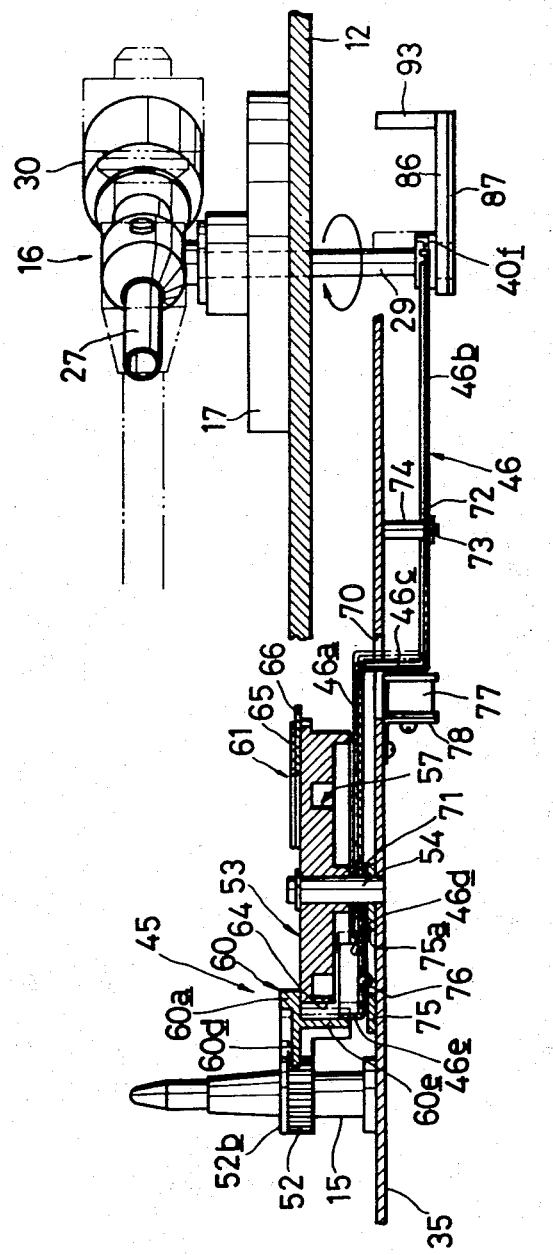
FIG. 21 is a sectional view taken along the line XXI—XXI on FIG. 18.
Figure 22:
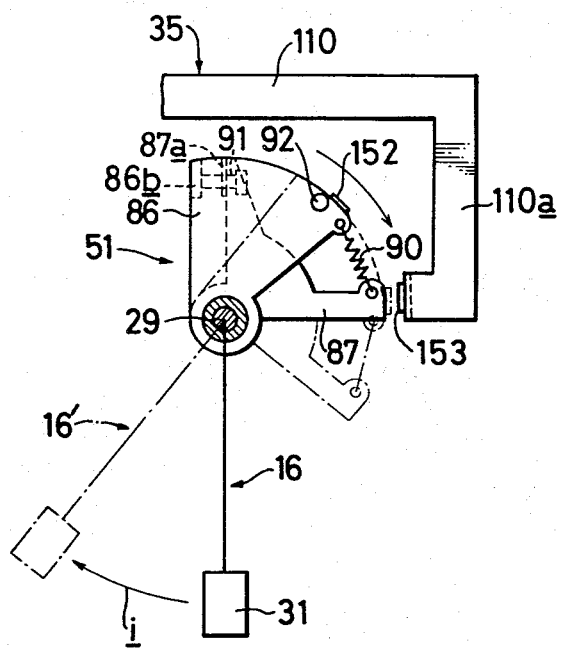
Figure 23:
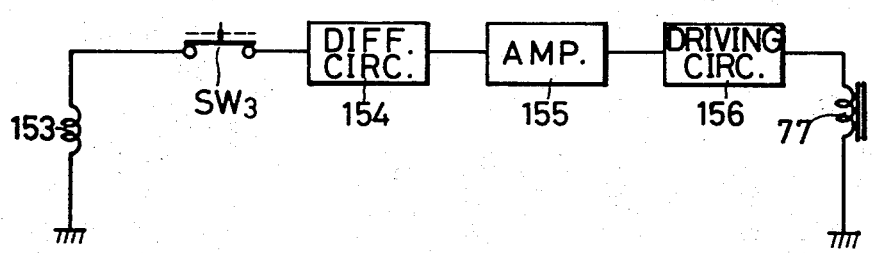
Figure 24:
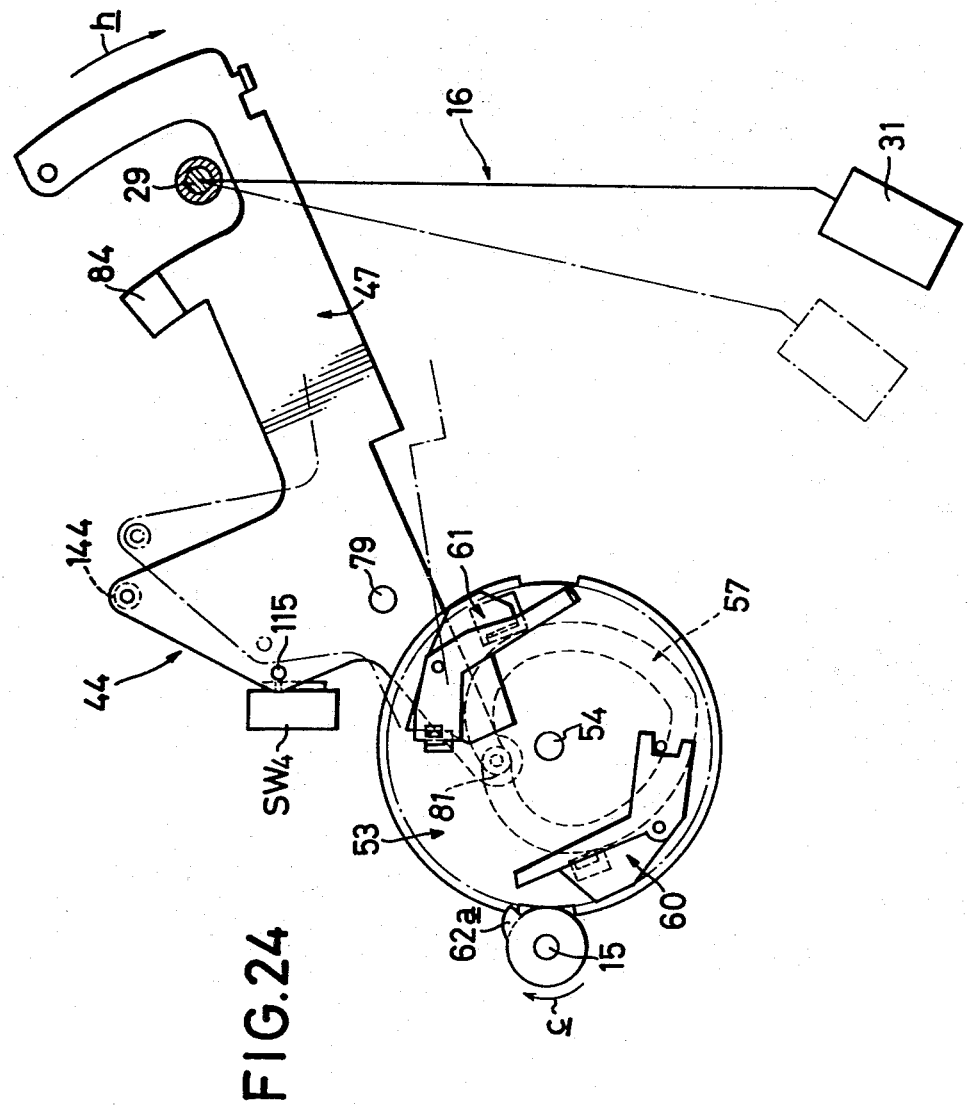
Figure 25:
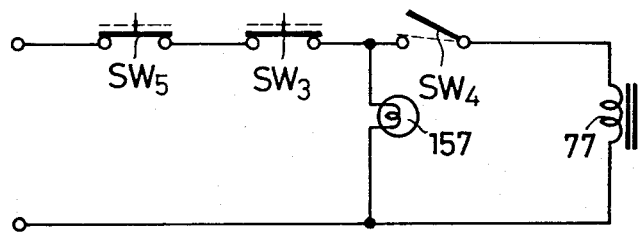
Figure 26:
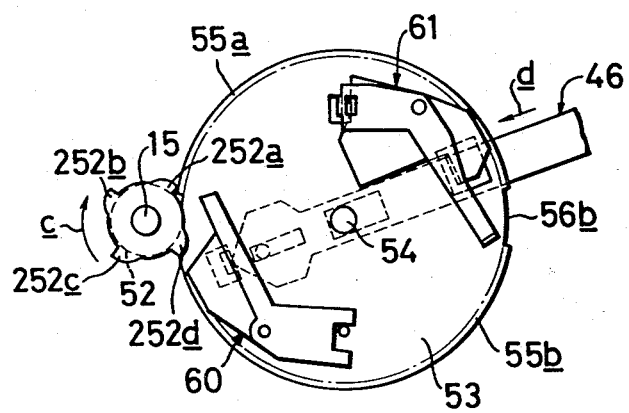
Figure 27:
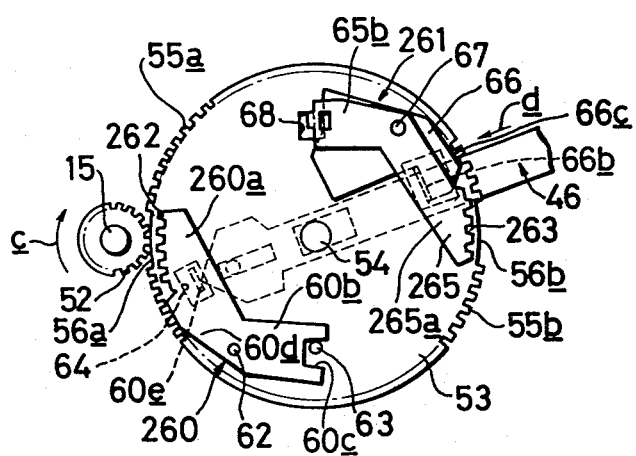
Figure 28:
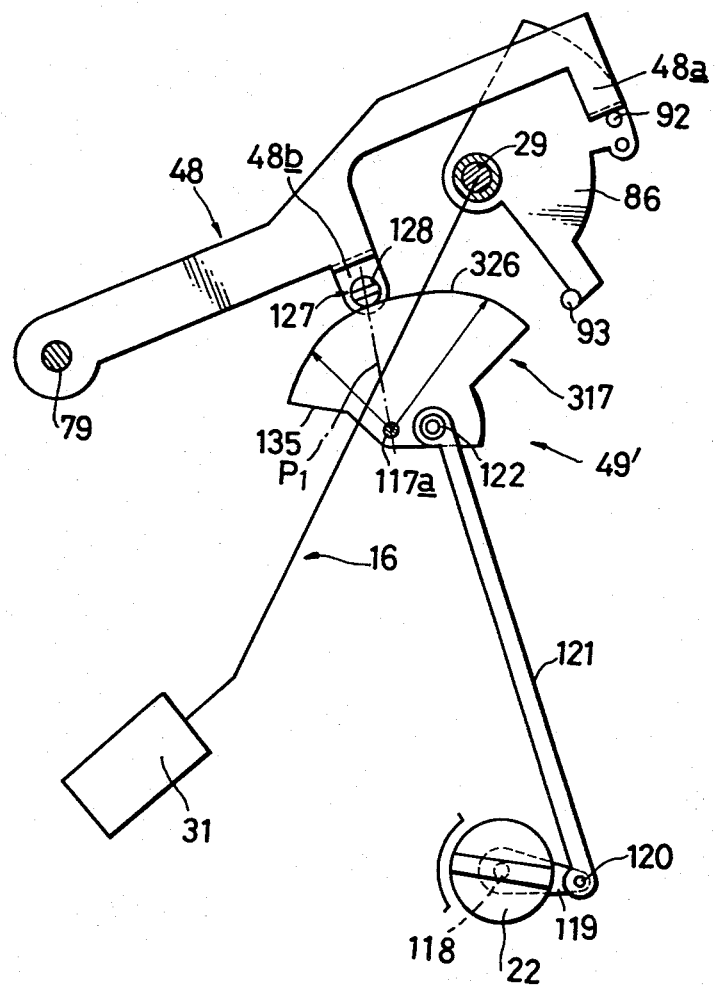

As shown particularly on FIGS. 20 and 21, the control gear assembly 45 includes a drive gear or pinion 52 secured on driving shaft 15 above chassis 35, and a driven or control gear 53 which is rotatably mounted on a shaft 54 which projects upwardly from chassis 35. The upper portion of the periphery of control gear 53 is formed with two sets of gear teeth 55a and 55b each extending along slightly less than one-half of the circumference of gear 53, with the sets of gear teeth 55a and 55b being separated from each other by diametrically opposed toothless gaps 56a and 56b. The shaft 54 supporting control gear 53 is positioned in respect to driving shaft 15 so as to provide meshing engagement of pinion 52 with the set of teeth 55a or 55b when the respective set of teeth faces toward shaft 15 so as to drive gear 53 from the latter; whereas, shaft 15 and pinion 52 can continue to rotate with control gear 53 remaining at rest when such gear 53 is disposed with either the toothless gap 56a and 56b facing toward shaft 15, as shown on FIGS. 5A and 5B, respectively. During the engagement of gear teeth 55a with pinion 52 and the corresponding one-half revolution or lead-in movement of control gear 53, control mechanism 44 effects the lead-in of tone arm assembly 16 from its rest position to the predetermined set-down position of the stylus on a record and, during the engagement of gear teeth 55b with pinion 52 and the corresponding one-half revolution or return movement of gear 53, control mechanism 44 effects the return of tone arm assembly 16 to its rest position, as hereinafter described in detail.

Figure 7B:
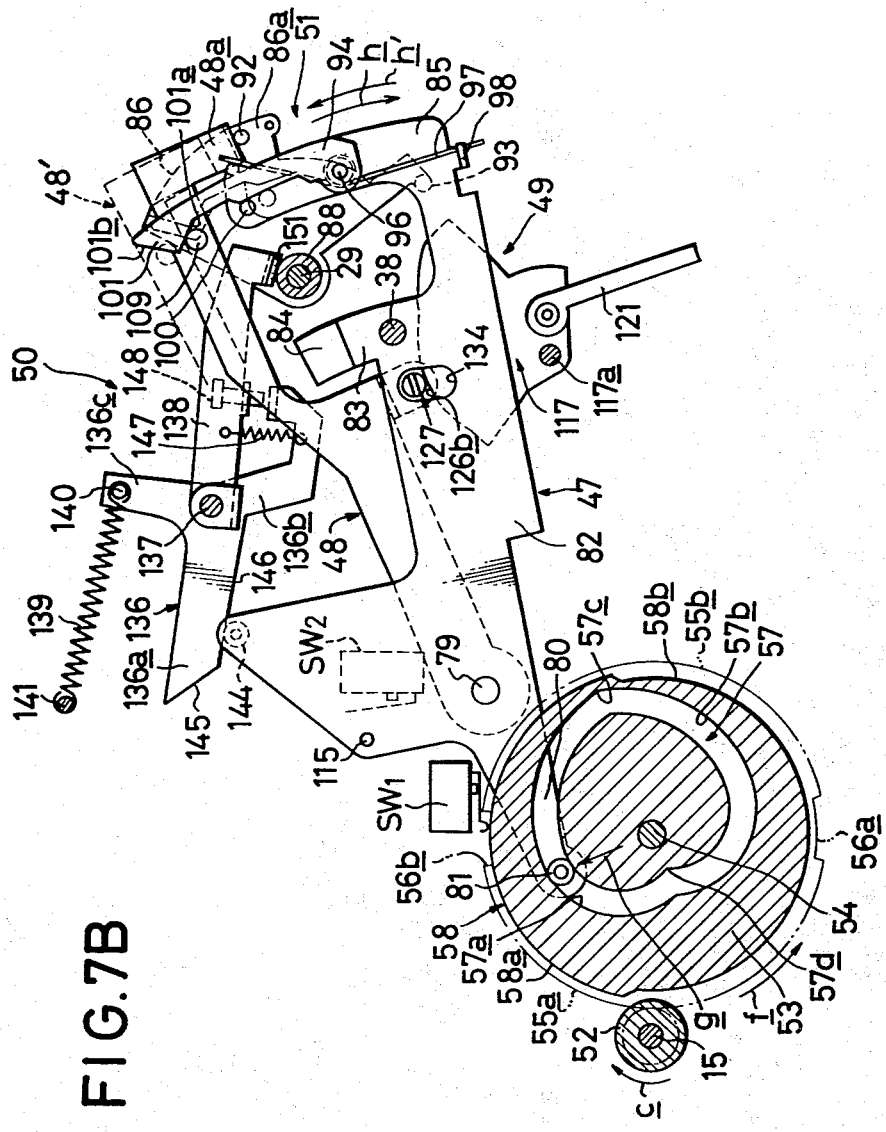
Figure 7D:
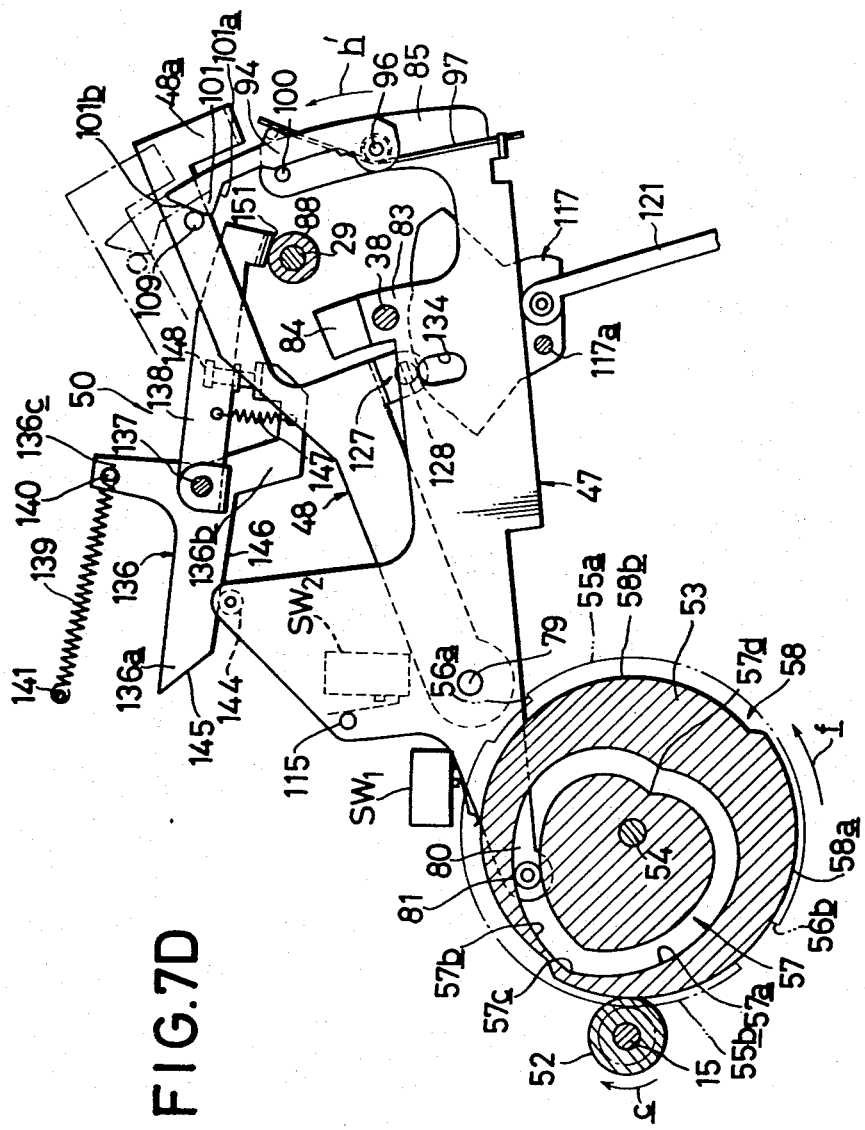

In order to effect the lead-in and return swinging movements of tone arm assembly 16 in response to turning of control gear 53, a cam groove 57 is formed in control gear 53 and opens downwardly at the lower surface of the latter (FIG. 21). As shown particularly on FIGS. 7A-7E and 8A-8C, cam groove 57 is heart-shaped so as to include cam groove portions 57a and 57b which are symmetrical to each other and respectively operative to effect the lead-in and return swinging movements of tone arm assembly 16. By reason of the hear-shaped configuration of cam groove 57, an inverted cusp or depression 57c is defined in the outer wall surface of cam groove 57 at the connection of cam groove portion 57a to cam groove portion 57b, and a similar inverted cusp or depression 57d is formed in the inner wall surface of cam groove 57 at the connection of cam groove portion 57b to cam groove portion 57a. The periphery of the lower portion of the control gear 53 defines a radial cam 58 (FIGS. 7A-7E) for controlling a micro-switch $SW_1$ mounted on chassis 35 (FIG. 6), and such radial cam is comprised of a radially raised cam portion 58a actuating switch $SW_1$ during the lead-in movement of control gear 53, and a radially depressed cam portion 58b extending over the remainder of the periphery of control gear 53 so as to determine the state of switch $SW_1$ in the stop and play positions of gear 53, that is, when the toothless gap 56a or 56b faces toward pinion 52 (FIGS. 7A and 7C) and during the return movement of gear 53 at the conclusion of a record playing operation (FIGS. 7D and 7E). Thus, switch $SW_1$, when actuated by cam portion 58a, detects the lead-in operation of record player 10. Finally, as shown in broken lines on FIG. 5A, a pair of pins 59a and 59b depend from the lower surface of control gear 53 at diametrically opposed locations that are slightly in advance of the locations of toothless gaps 56b and 56a, respectively, considered in the counterclockwise direction of rotation of control gear 53, as viewed from above.

In order to initiate the lead-in movement of control gear 53 from its stop position (FIG. 5A) in which toothless gap 56a faces pinion 52, and the return movement of gear 53 from its play position (FIG. 5B) in which toothless gap 56b faces pinion 52, control gear assembly 45 is further shown to comprise lead-in and return clutch mechanisms 60 and 61, respectively, which are substantially diametrically opposed on the flat upper surface of control gear 53. As shown particularly on FIGS. 18, 19 and 20, lead-in clutch mechanism 60 may be in the form of a one-piece molded plastic lever pivoted, intermediate its ends, on a pin 62 projecting upwardly from control gear 53 and having oppositely directed arms 60a and 60b which are at an angle to each other. The end of lever arm 60b has a cutout 60c therein which loosely receives a pin 63 projecting upwardly from control gear 53 for limiting the angular movement of lead-in clutch mechanism 60 to the engaged and disengaged positions shown in full and broken lines respectively on FIG. 18. Clutch mechanism 60 further has a cam portion 60d extending outwardly from arm 60a so as to project radially beyond the teeth 55b of control gear 53 when clutch mechanism 60 is in its engaged position. As shown, lead-in clutch mechanism 60 is dimensioned and its pivot pin 62 is located so that, in the engaged position of such clutch mechanism indicated in full lines on FIG. 18, the free end of lever arm 60a projects above toothless gap 56a of control gear 53. Finally, a projection 60e depends from lever arm 60a and extends downwardly through a hole 64 formed in control gear 53 (FIG. 21) so as to be actuable by slide 46, as hereinafter described in detail.

Figure 18:
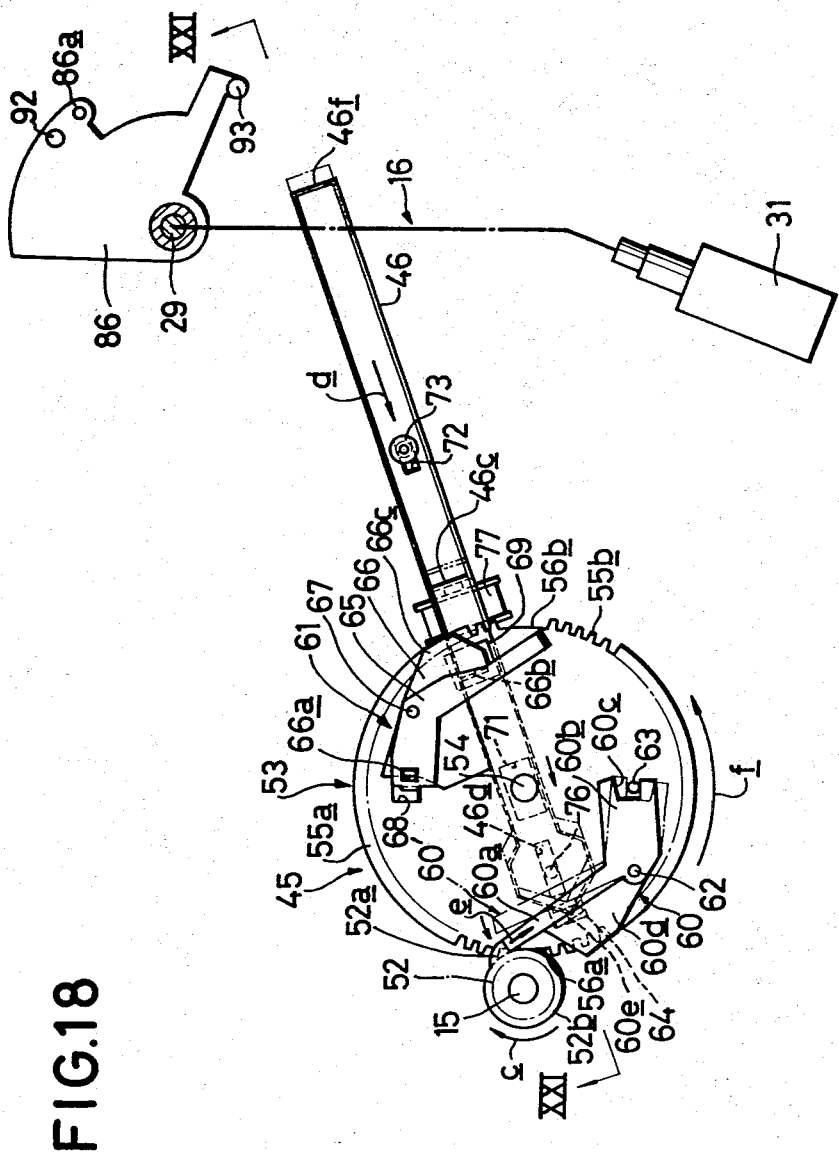
FIGS. 18 and 19 are plan views showing lead-in and return clutch mechanisms associated with the control gear and an actuator for such clutch mechanisms, with the control gear being illustrated in its stop position and in its play position, respectively.
Figure 19:
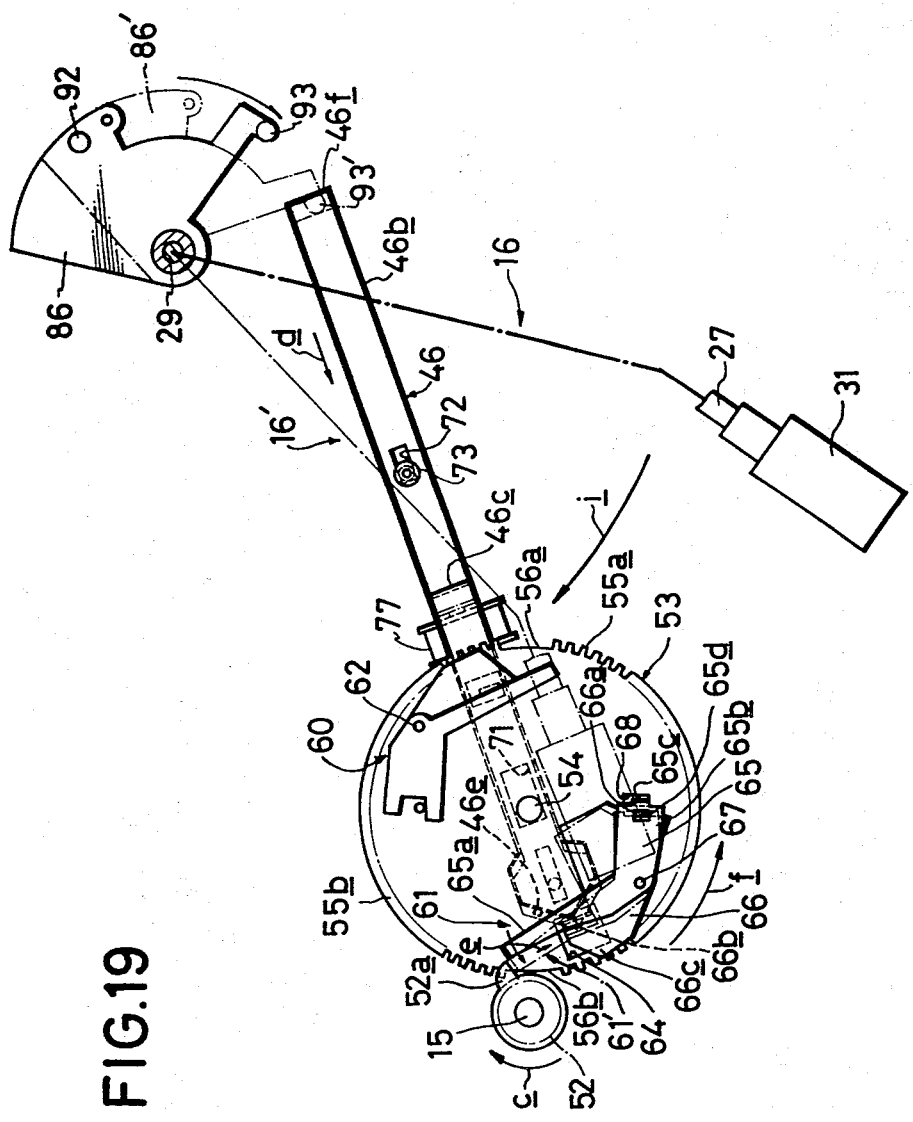

The return clutch mechanism 61 is shown to include an upper engaging member 65 superposed on a lower cam member 66, with both members 65 and 66 being pivotally mounted, intermediate their ends, on a pivot pin 67 projecting from the upper surface of control gear 53 so that engaging member 65 and cam member 66 are angularly displaceable relative to each other and relative to gear 53. As shown, the upper engaging member 65 is substantially in the form of a lever having oppositely directed arms 65a and 65b which are at an angle to each other, with engaging member 65 being dimensioned and the pivot pin 67 being located so that, in an engaged position of clutch mechanism 61, as indicated in broken lines at 61' on FIG. 19, the free end of arm 65a projects above toothless gap 56b of control gear 53. The angular displacement or swinging movement of engaging member 65 relative to control gear 53 between its engaged position shown in broken lines on FIG. 19 and on FIG. 20 and its disengaged position shown in full lines on FIGS. 18 and 19 is limited by a tab 65c directed downwardly from the free end of lever arm 65b and engaging loosely in a hole 68 formed in control gear 53. The angular displacement of engaging member 65 and cam member 66 relative to each other is limited by engagement, in a hole 65d formed in lever arm 65b, of an upwardly struck tab or projection 66a extending from the underlying cam member 66. The portion of the cam member 66 which extends from pivot pin 67 in the same general direction as lever arm 65a is formed with a downwardly directed projection 66b which passes through a hole 69 in control gear 53 so as to be actuable by slide 46, as hereinafter described in detail. When member 66 is thus actuated, a cam portion 66c thereof is made to project radially beyond teeth 55a on gear 53, as shown on FIG. 20, and engaging member 65 is moved to its engaged position through the lost-motion connection provided between members 65 and 66 by the engagement of projection 66a in hole 65d.

Control gear assembly 45 is completed by an abutment or nose 52a extending radially outward from a rim 52b provided integrally with pinion 52 at the top of the latter. Thus, when lead-in clutch mechanism 60 is displaced to its engaged position with gear 53 in its stop position (FIG. 18), abutment 52a in rotating with pinion 52 acts on the end of lever arm 60a to propel the latter longitudinally and thereby initiate turning of gear 53 until gear teeth 55a mesh with pinion 52 for effecting the lead-in movement of gear 53. Similarly, when return clutch mechanism 61 is displaced to its engaged position with gear 53 in its play position (FIG. 19), abutment 52a acts on the end of lever arm 65a to propel the latter longitudinally and thereby initiate turning of gear 53 until gear teeth 55b mesh with pinion 52 for effecting the return movement of gear 53.

As shown particularly on FIG. 21, actuating slide 46 is constituted by an elongated member formed with step at its middle portion so as to have upper and lower horizontal portions 46a and 46b respectively disposed above and below chassis 35 and being connected by a vertical portion 46c which extends through an opening 70 in the chassis. Upper horizontal portion 46a extends between chassis 35 and the underside of control gear 53 and is formed with an elongated hole 71 through which shaft 54 extends. An elongated hole 72 (FIGS. 18, 19 and 21) is formed in lower horizontal portion 46b and receives a guide roller 73 carried by a post 74 depending from chassis 35. Further, a ball receiver 75 is fixed on chassis 35 under control gear 53 and is formed with a slit 75a along which a steel ball 76 free to roll, and the free end portion of upper horizontal portions 46a is formed with a slit 46d aligned with slit 75a and also receiving ball 76, from which it follows that actuating slide 46 is guided for free longitudinal sliding movement in respect to chassis 35 between operative and inoperative positions respectively shown in full lines on FIGS. 18 and 19. Further, the free end of upper horizontal portion 46a of slide 46 is formed with an upwardly directed, V-shaped projection 46e which is selectively engageable with the projection 60e of clutch mechanism 60 when control geear 53 is in its start position (FIG. 5A), or with the projection 66b of clutch mechanism 61 when control gear 53 is in its play position (FIG. 5B) for actuating the respective clutch mechanism 60 and 61 to its engaged position in response to longitudinal movement of actuating slide 46 from its inoperative position to its operative position. It is also to be noted that the previously described pins 59a and 59b depending from control gear 53 are radially positioned with respect to the axis of the latter so that, near the conclusion of the lead-in movement or the return movement of control gear 53 resulting from the meshing of its gear teeth 55a or 55b, respectively with pinion 52, the pin 59a or 59b, respectively, will act against a sloping flank of the V-shaped projection 46e on actuating slide 46 for returning the latter from its operative position shown on FIG. 18 to its inoperative position shown on FIGS. 5A, 5B and 19.

As shown particularly on FIG. 21, an electromagnet 77 is supported by a bracket 78 at the underside of chassis 35 adjacent opening 70 so that, upon energizing of electro-magnet 77, the latter will attract the vertical portion 46c of actuating slide 46 and thereby move the latter toward the left, as viewed on the drawing, for displacement of slide 46 from its inoperative position to its operative position.

As shown most clearly on FIGS. 7A-7E and 8A-8C, the main lever 47, which is disposed above chassis 35, is pivoted, intermediate its ends, on the upper portion of a pivot pin 79 supported by chassis 35 at a location between shaft 54 of control gear 53 and support shaft 29 of tone arm assembly 16. Main lever 47 includes an arm 80 extending in the direction from pivot pin 79 under control gear 53, and such arm 80, at its free end, carries a cam follower roller 81 which engages in cam groove 57 for angularly displacing main lever 47 between a stop position (FIG. 7A) and a play position (FIG. 7C) in response to turning of control gear 53. Main lever 47 is further shown to include an arm 82 extending from pivot pin 79 substantially in the direction opposed to arm 80 and reaching under shaft 38 of arm lifter 37 so as to support shaft 38 at the lower end of the latter (FIG. 4). At the portion of lever arm 82 where the latter is engaged by shaft 38, an extension 83 is directed rearwardly from lever arm 82 and terminates in a downwardly inclined ramp 84 which moves under shaft 38 in the play position of main lever 47 (FIG. 7C). Thus, arm 82 of main lever 47 supports shaft 38 and arm lifter 37 in an elevated position corresponding to the raised position of tone arm 16 shown in full lines on FIG. 4 when main lever 47 is in its stop position (FIG. 7A) and during lead-in and return movements of main lever 47 (FIG. 7B). However, at the conclusion of lead-in movement of main lever 47, that is, when lever 47 attains its play position (FIG. 7C), downwardly inclined ramp 84 moves under shaft 38 to permit downward movement of the latter and of arm lifter 37 therewith so that tone arm 27 is lowered to the position indicated in broken lines on FIG. 4 for engaging the stylus 33 with a record R on turntable 14. The outer or free end portion of lever arm 82 is substantially L-shaped to provide a rearwardly directed extension 85 which, with previously mentioned extension 83, defines a cutout 86 therebetween through which tone arm support shaft 29 can extend (FIG. 7A).

Figure 9:
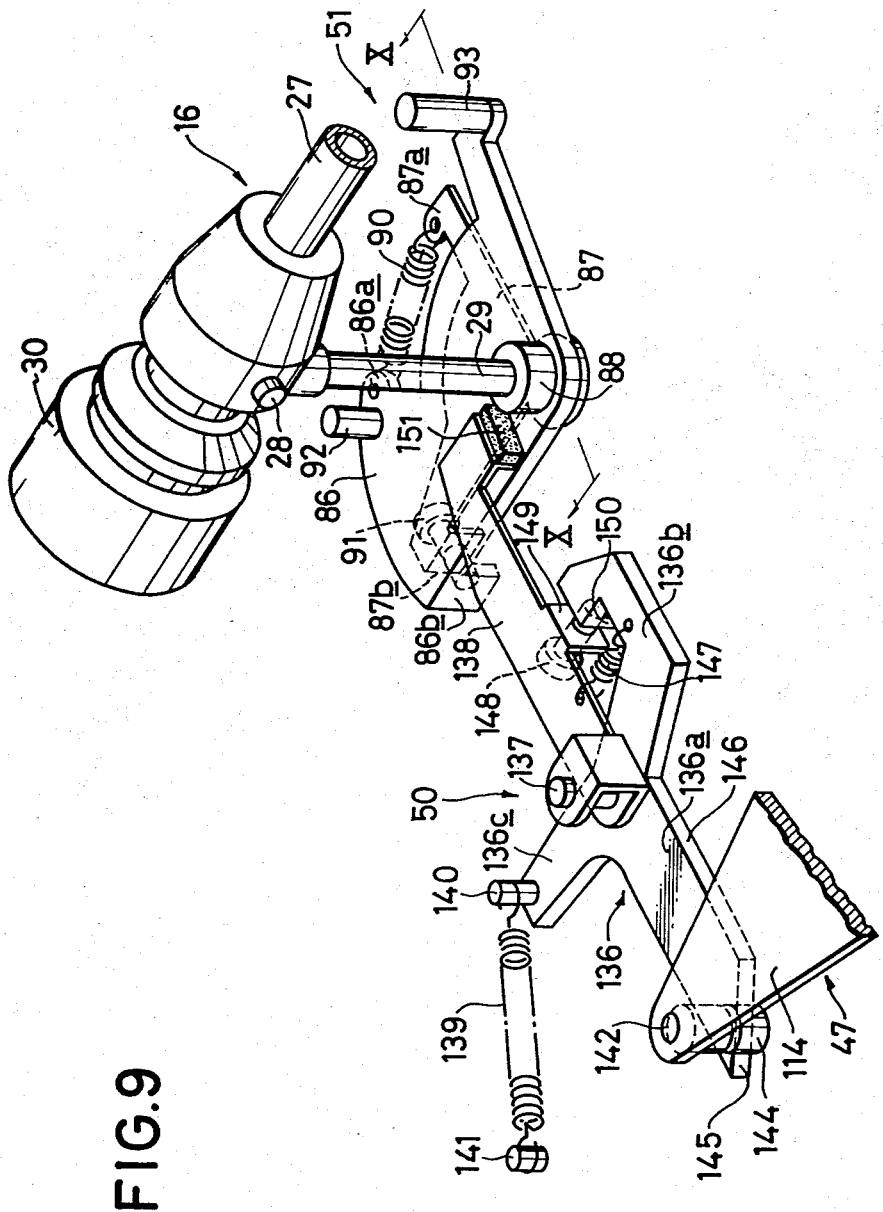
FIG. 9 is a perspective view illustrating the braking mechanism and the relation of the latter to the tone arm assembly.
Figure 10:
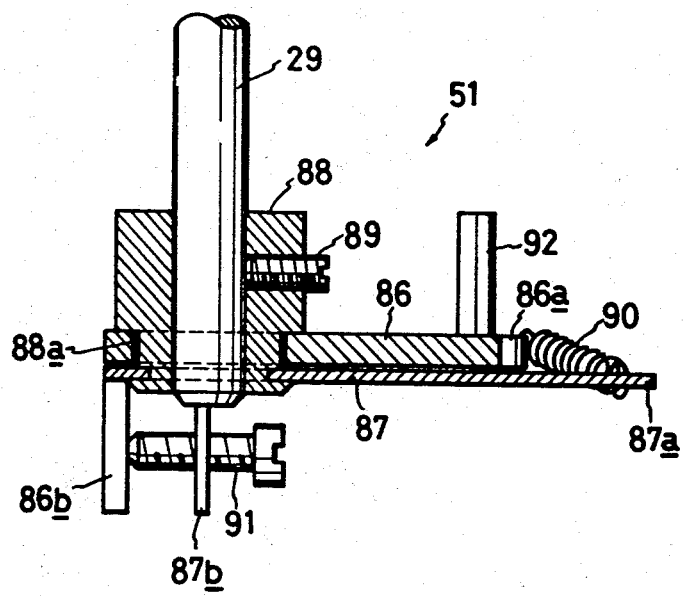
FIG. 10 is an enlarged detail sectional view taken along the line X—X on FIG. 9.

As shown particularly on FIGS. 9 and 10, tone arm drive mechanism 51 includes upper and lower generally sector-shaped members 86 and 87, respectively, mounted on the lower end portion of tone arm support shaft 29 so as to be turnable about the axis of the latter. A boss 88 is secured to shaft 29, as by a set screw 89 (FIG. 10), and the lower sector-shaped member 87 is suitably fixed to the lower end of boss 88 so as to be rotatably coupled with shaft 29. Boss 88 is further shown to have a reduced diameter portion 88a above member 87 which is turnably received in a hole in sector-shaped member 86 so that the latter is angularly displaceable about the axis of shaft 29 relative to the latter and to the lower sector-shaped member 87. A tension spring 90 is connected between a radially extending arm 87a on member 87 and an anchor 86a on member 86 for urging the latter to turn in the clockwise direction, as viewed on FIGS. 5A,5B and 9, relative to member 87. An adjustable limit screw 91 (FIG. 10) extends through a tapped hole in a tab 87b depending from an edge of sector-shaped member 87 and is engageable against a tab 86b depending from sector-shaped member 86 for adjustably limiting the angular displacement of member 86 relative to member 87 under the urging of spring 90. Pins 92 and 93 are directed upwardly from sector-shaped member 86 at spaced apart locations adjacent the periphery of the latter. As hereinafter described in detail, pin 92 is adapted to be acted upon for causing the lead-in and return swinging movements of tone arm assembly 16. On the other hand, pin 93 is positioned so that it may act against the free end 46f of lower horizontal portion 46b of actuating slide 46 for mechanically effecting the movement of the latter from its inoperative positions to its operative position when tone arm assemly 16 is angularly displaced, at the conclusion of a record playing operation, to the position indicated in broken lines at 16' on FIG. 19 and which corresponds to the engagement of the stylus in the final non-recorded turns of the record groove.

Figure 5B:
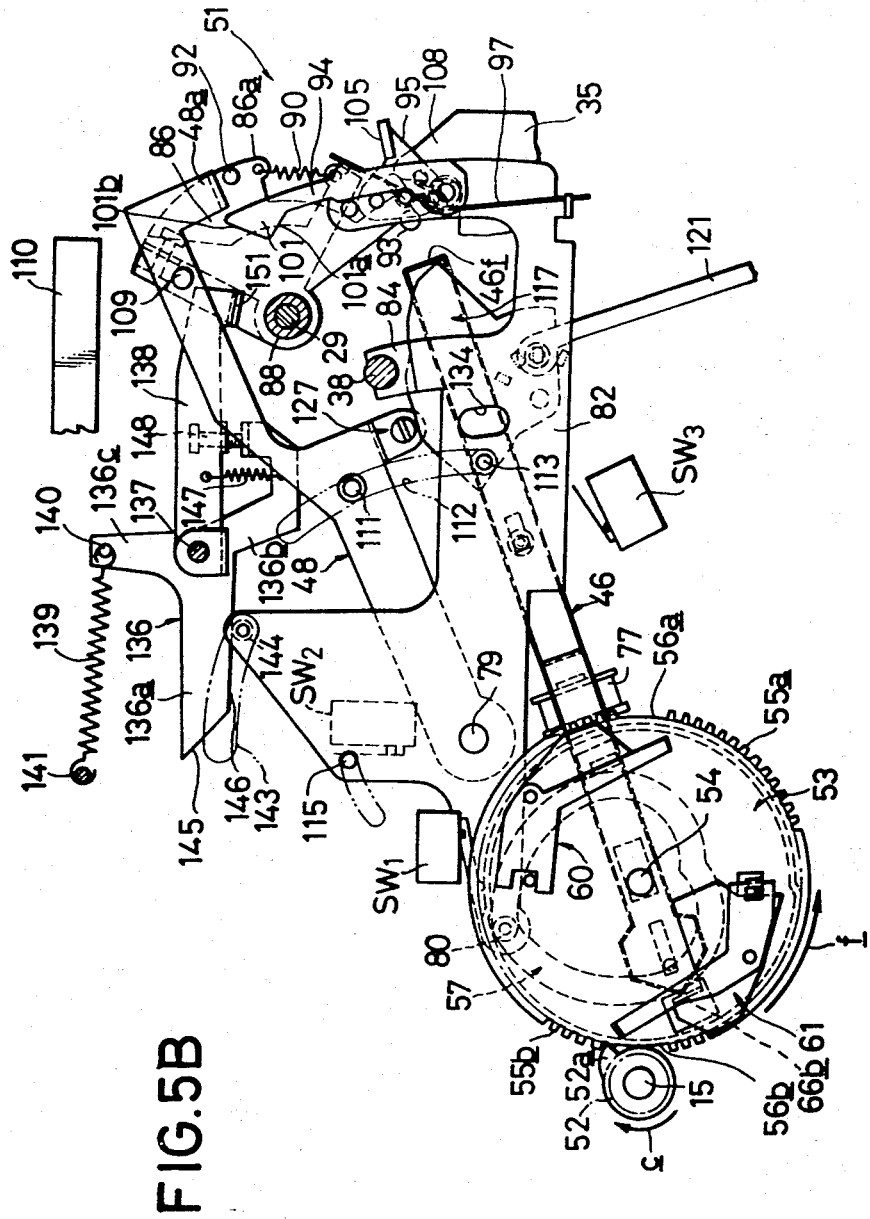
Figure 11:
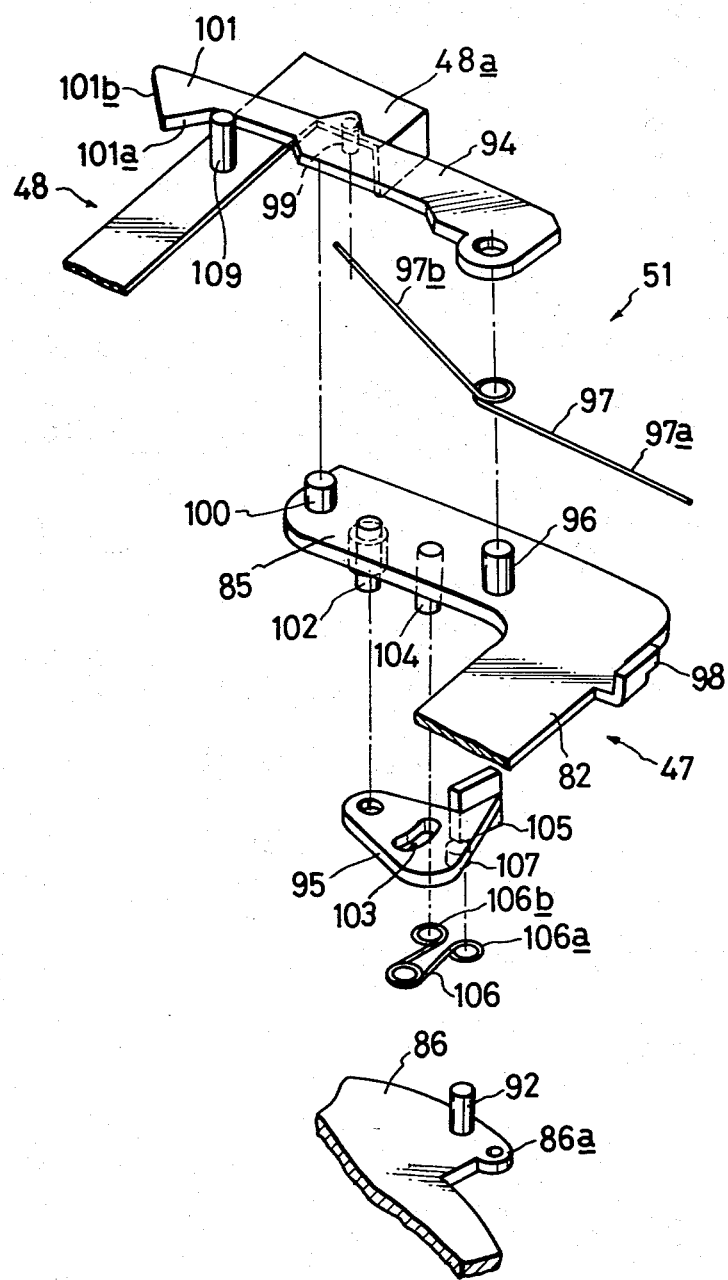
FIG. 11 is an exploded perspective view showing elements of the tone arm drive mechanism.

In order to ensure that manual interference with the lead-in or return swinging movements of tone arm 16 will not cause damage to automatic control mechanism 44, the tone arm drive mechanism 51 is further shown to comprise a hooked lead-in drive member 94 and a return drive member 95 (FIGS. 5A,5B and 11). As shown particularly on FIG. 11, lead-in drive member 94 is pivotally mounted on, and extends rearwardly from a pivot pin 96 directed upwardly from extension 85 of main lever 47. A torsion spring 97 extends around pivot pin 96 and has legs 97a and 97b which respectively engage a keeper 98 on main lever 47 and a pin 99 depending from drive member 94 so that spring 97 urges drive member 94 in the counter-clockwise direction relative to lever extension 85, as viewed on FIGS. 5A and 5B, whereby to normally engage drive member 94 with a stop pin 100 on lever extension 85. The free or rear end portion of drive member 94 has a nose or barb 101 extending from the side thereof facing in the direction in which drive member 94 is urged by spring 97, and such nose 101 is shown to have angled flanks 101a and 101b.

The return drive member 95 is shown to include a generally sector-shaped plate which, at its apex, is pivoted on a pin 102 depending from lever extension 85, and which has an arcuate slot 103 concentric with the pivoting axis of drive member 95 and slidably receiving a pin 104 depending from lever extension 85 for limiting the pivotal movement of drive member 95 in respect to lever extension 85. An abutment 105 is directed laterally outward from the sector-shaped plate of drive member 95 for engagement with pin 92 on member 86 in effecting the return swinging movement of tone arm assembly 16, as hereinafter described in detail. Further, a toggle spring 106 is provided with eyes 106a and 106b at its opposite ends which respectively engage a pin 107 depending from drive member 95 and the lower end of the pin 104 received in arcuate slot 103. The pin 107 is disposed so as to be substantially on a line with pin 104 and pin 102 defining the pivoting axis of drive member 95 when pin 104 is substantially at the center of arcuate slot 103, and toggle spring 106 urges pins 104 and 107 away from each other. Therefore, toggle spring 106 may urge drive member 95 to an extended position, as shown on FIG. 5B and in full lines on FIGS. 8A and 8B, in which pin 104 engages one end of slot 103 and abutment 105 extends substantially outward from lever extension 85 as so to be engageable with pin 92, as hereinafter described. Alternatively, toggle spring 106 may urge drive member 95 to a retracted position, as shown on FIG. 5A and in full lines on FIG. 8C, in which pin 104 engages the other end of slot 103 and abutment 105 is near to the outer edge of lever extension 85 so as to be movable past pin 92 without engaging the latter. As shown on FIGS. 5A and 5B, chassis 35 is provided with a projection 108 engageable with the abutment 105 of drive member 95 for displacing the latter at least halfway from its retracted position to its extended position, and thereby permitting toggle spring 106 to complete the movement of drive member 95 to its extended position in response to movement of drive member 95, in its retracted position, with main lever 47 to the conclusion of the lead-in movement of such main lever.

The lead-in lever 48 which is disposed below chassis 35 is shown to be pivotally mounted, at one end, on the same pivot pin 79 as main lever 47 (FIGS. 5A,5B and 7A–7E). Lead-in lever 48 is shown to extend in back of tone arm support shaft 29, and the free end portion of lever 48 is provided with a forwardly directed extension 48a which is engageable with pin 92 on member 86 for effecting the lead-in swinging movement of tone arm assembly 16 as hereinafter described in detail. A coupling pin 109 is directed upwardly from the free end portion of lead-in lever 48 through a cutout 35a (FIG. 2) in chassis 35, and such coupling pin 109 is engageable by nose 101 of lead-in drive member 94 (FIG. 7B) for causing lead-in lever 48 to follow the lead-in movement of main lever 47 to the extent that record size selecting mechanism 49 permits such movement of lead-in lever 48. A portion 110 of chassis 35 (FIGS. 2,5A and 5B) which defines the back edge of cutout 35a acts as an abutment engageable by pin 109 on lead-in lever 48 for limiting the return swinging movement of lever 48 in the counter-clockwise direction as viewed on FIG. 5A.

In order to ensure that lead-in lever 48 will be smoothly swingable about pivot pin 79, a flanged guide roller 111 is rotatably mounted on the upper surfave of the central portion of lever 48 and engages in an elongated arcuate slot 112 formed in chassis 35 so as to be concentric with pivot pin 79. Smooth swinging movement of main lever 47 is similarly ensured by a pin 113 depending from the middle portion of arm 82 of lever 47 and slidably engagingin arcuate slot 112 with a washer on pin 113 being interposed between lever 47 and chassis 35.

Main lever 47 is further shown to include an arm 114 directed rearwardly from pivot pin 79 substantially at right angles to arms 80 and 82. In order to detect a play operation of record player 10, a pin 115 depends from arm 114 of main lever 47 through an arcuate slot 116 formed in chassis 35, as shown in broken lines on FIGS. 5A and 5B, and such pin 115 is adapted to actuate a micro-switch SW$_2$ suitably mounted below chassis 35. More particularly, switch SW$_2$ is disposed so as to be actuated by pin 115 and thereby detect the play operation of record player 10 when main lever 47 is positioned as shown on FIG. 7C, that is, when main lever 47 is disposed by cam 57 in the position corresponding to the play position of control gear 53 in which the toothless gap 56b of the latter faces toward pinion 52.

As shown particularly on FIGS. 12–17, the record size selecting mechanism 49 may comprise a generally sectorshaped size selecting cam member 117 which is disposed below chassis 35, and which is pivoted on a pin 117a depending from the chassis. The record size selecting knob 22 is fixed on the upper end of a shaft 118 which is suitably journalled in upper panel 12 and which, at its lower end, has a radial arm 119 secured to shaft 118. The outer end of arm 119 is pivotally connected, as at 120, to the forward end of an elongated link 121 which extends rearwardly to the size selecting cam member 117. As shown particularly on FIG. 15, an upwardly opening cylindrical housing 122 is formed as an integral part of size selecting cam member 117 and is spaced radially from the pivoting axis of the latter defined by pin 117a. The cylindrical housing 122, at its upper end, extends above size-selecting cam member 117, and the back end of link 121 is formed with a circular opening 121a which receives the upper end of cylindrical housing 122 for pivotally connecting link 121 to cam member 117. The cylindrical housing 122 receives a detent ball 123 which is urged upwardly against the undersurface of chassis 35 by a helical compression spring 124 in housing 122. Four suitably spaced apart holes 125 are formed in chassis 35 along a circular arc corresponding to the path along which ball 123 is moved in response to angular displacement of size-selecting cam member 117. Thus, the selective engagement of ball 123 in the holes 125 provides a detent action for releasably retaining cam member 117 in angular positions respectively corresponding to three different set-down positions during automatic lead-in operation of record player 10 and to manual lead-in operation of the record player.

Figure 14:
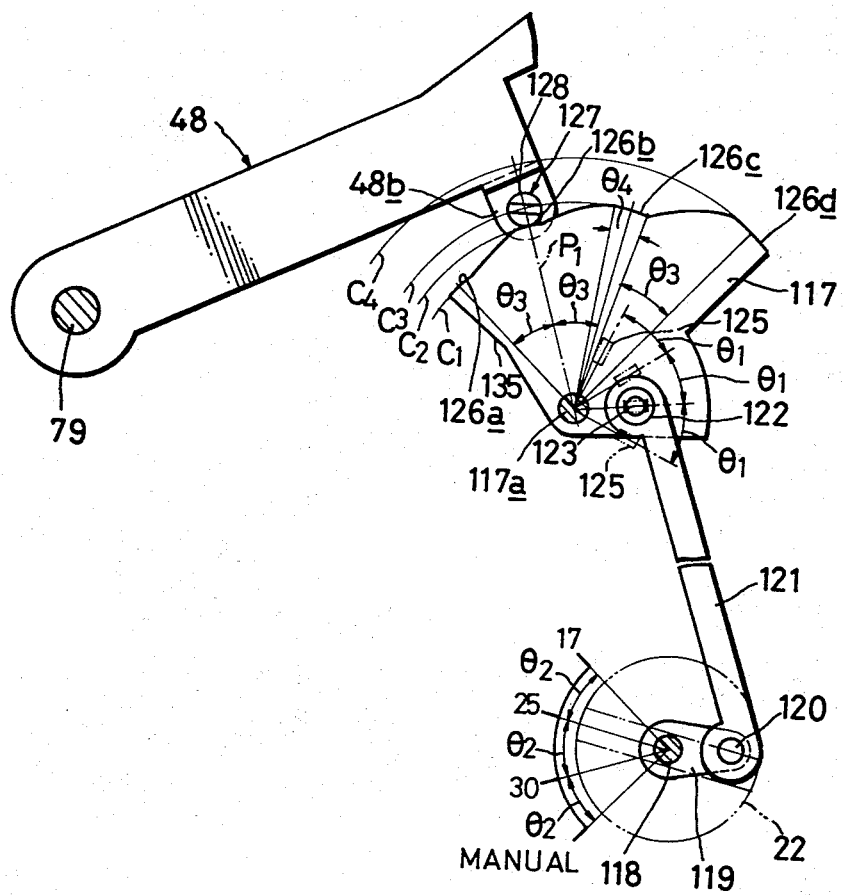
FIG. 14 is a fragmentary enlarged plan view of a portion of the record size selecting mechanism of FIG. 12.
Figure 17:
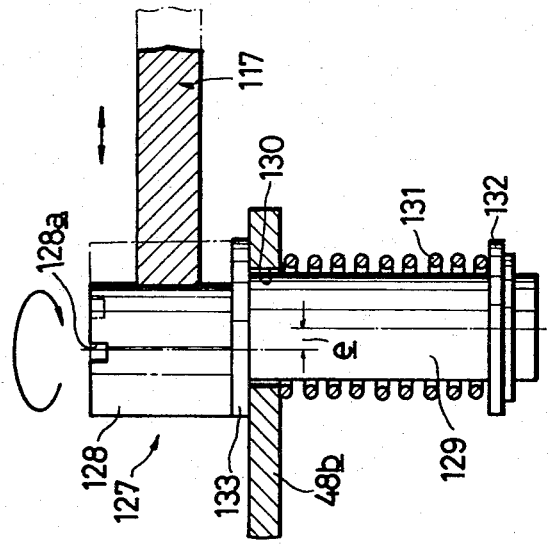
FIG. 17 is a sectional view taken along the line XVII—XVII on FIG. 16.
Figure 16:
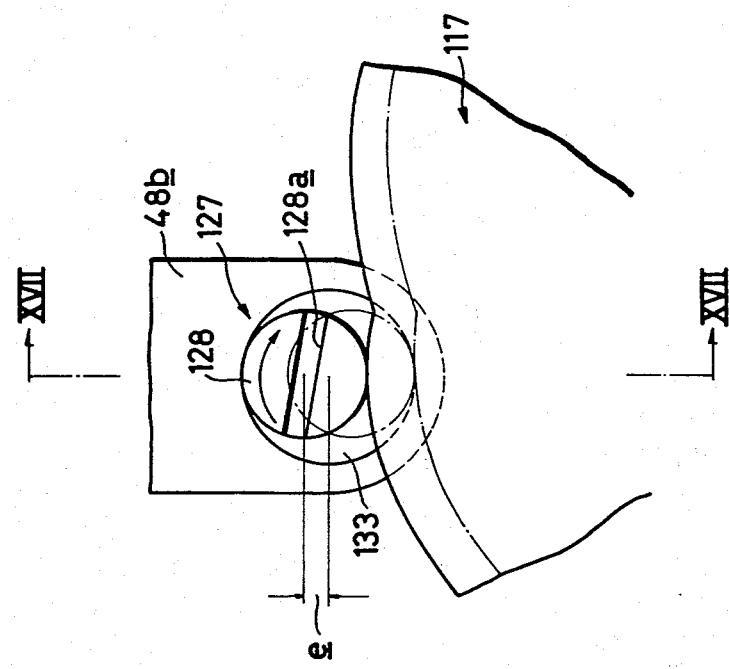
FIG. 16 is an enlarged fragmentary plan view of an adjustable abutment included in the record size selecting mechanism for effecting fine adjustment of the set-down position.

As shown particularly on FIG. 14, the four holes 125 for selectively receiving detent ball 123 may be spaced apart by equal angles $\theta_1$ of, for example, 30°, while suitable indicia are provided on upper panel 12 about knob 22 at locations spaced apart by angles $\theta_2$ which may be equal to the angles $\theta_2$ so as to indicate the positions of knob 22 for establishing the set-down positions for three different size records, for example, records having diameters of 17cm., 25cm., and 30cm., and for establishing the manual lead-in operation of the record player.

The generally arcuate edge of sector-shaped sizeselecting cam member 117 is shown to be formed with four stopper edge portions 126a, 126b, 126c and 126d which are formed at equal angular intervals $\theta_3$ of 30° along arcs of respective circles $C_1, C_2, C_3$ and $C_4$ at progressively increasing radial distances from the pivot pin 117a for establishing the set-down positions for records having diameters of 17cm., 25cm. and 30cm. and for selecting manual lead-in operation of the record player, respectively. Further, each of the stopper edge portions 126a–126d is shown to have an angular extent $\theta_4$ of approximately 10°. It will be apparent that, in response to rotation of knob 22 to a selected position indicated by the associated indicia on upper panel 12 of the cabinet, cam member 117 is similarly positioned to engage detent ball 123 in a respective one of the holes 125 and to dipose a respective one of stopper edge portions 126a–126d at the operative position indicated at P$_1$ on FIG. 14.

Further, in order to limit the swinging of lead-in lever 48 with main lever 47 during the lead-in movement of the latter, an abutment member 127 extends upwardly from a forwardly directed extension 48b at the middle portion of lead-in lever 48 and is engageable with the one of stopper edge portions 126a–126d then disposed at the operative position P$_1$. As shown particularly on FIGS. 16 and 17, in order to provide for fine adjustment of the set-down positions established by stopper edge portions 126a, 126b and 126c of cam member 117, abutment member 127 on lead-in lever 48 preferably is constituted by a cylindrical head 128 eccentrically disposed on a support shaft 129 which passes rotatably through a hole 130 in extension 48b of lever 48. A relatively strong helical compression spring 131 extends about support shaft 129 between the undersurface of lever extension 48b and a washer 132 suitably secured on the lower end of shaft 129 so that a flange 133 provided between head 128 and shaft 129 will be strongly pressed against the upper surface of lever extension 48b for frictionally maintaining any rotationally adjusted position of abutment member 127.

It will be apparent that, by reason of the eccentricity e between the axis of supporting shaft 129 and the axis of head 128, rotation of abutment member 127 is effective to finely adjust the position of head-in lever 48 at which the cylindrical surface of head 128 engages a selected one of the stopper edge portions 126a–126c on cam member 117 for determining the respective set-down position of tone arm assembly 16. In order to permit such rotational adjustment of abutment member 127, head 128 thereof is formed with a slot 128a in its top surface which may be engaged by the blade of a screw driver or other tool inserted through a hole 134 (FIGS. 5A and 7A) in main lever 47. The hole 134 is positioned, as shown, to provide access to the slot 128a of head 128 when main lever 47 is in its stop position and, of course, similar holes (not shown) are provided in upper panel 12 and in chassis 35 for registration with hole 134 in the stop position of main lever 47.

Figure 12:
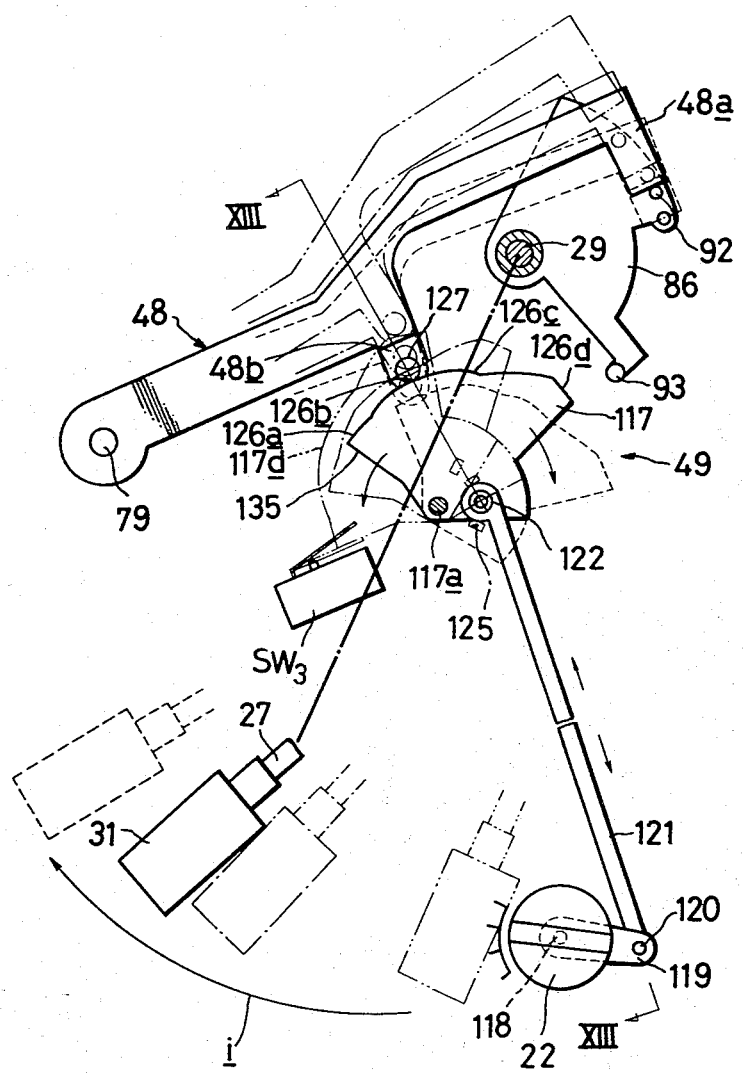
FIG. 12 is a plan view of a record size selecting mechanism.
Figure 13:
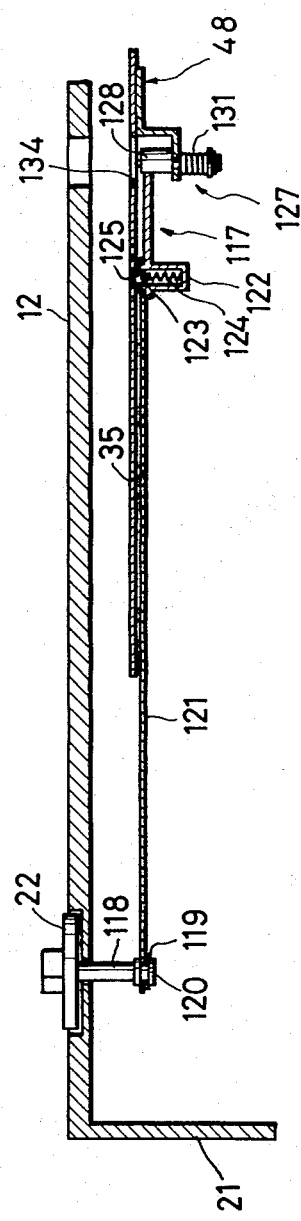
FIG. 13 is a sectional view taken along the line XIII—XIII of FIG. 12.

In order to detect when the manual lead-in operation of record player 10 has been established, a microswitch $SW_3$ is suitably mounted under chassis 35 (FIGS. 5A and 12) so as to be actuated by a radial or side edge 135 of size-selecting cam member 117 when the latter is disposed, as indicated in broken lines at 117d on FIG. 12, for locating its stopper edge portion 126d at the operative position $P_1$ of FIG. 14.

As shown particularly on FIG. 9, the brake mechanism 50 desirably includes a generally T-shaped brake operating lever 136 pivotally mounted under chassis 35 on a pivot pin 137 depending from the latter, and a brake operating lever 138 also disposed below chassis 35 and being pivoted, at one end, on pin 137. Lever 136 is shown to have angularly related arms 136a, 136b and 136c extending from its pivoting axis, and a tension spring 139 is connected between a pin 140 on the free end of arm 136c and an anchor pin 141 depending from chassis 35 for urging lever 136 in the counter-clockwise direction, as viewed on FIGS. 5A and 5B.

In order to control the position of brake operating lever 136 in dependence on the position of main lever 47, a pin 142 depends from the free end portion of rearwardly directed arm 114 of main lever 47 and extends downwardly through an arcuate slot 143 formed in chassis 35 so as to be concentric with the axis of pivot pin 79, as indicated in broken lines on FIGS. 5A and 5B. At its lower end, pin 142 carries a rotatable roller 144 which is engaged by either an oblique end edge 145 or a contiguous longitudinal side edge 146 of lever arm 136a under the urging of spring 139 on brake operating lever 136. Arm 136a of lever 136 is dimensioned and pivot pin 137 for such lever is located so that, when main lever 47 is in its stop position (FIG. 5A), roller 144 engages oblique end edge 145 of lever arm 136a and so that, as main lever 47 moves from its stop position (FIG. 5A) to its play position (FIG. 5B), that is, during the lead-in movement of main lever 47, roller 144 moves off oblique end edge 145 and then along contiguous side edge 146 for initially turning lever 136 in the clockwise direction against the force of spring 139 and then permitting spring 139 to restore lever 136 to its original position.

Referring to FIG. 9, it will be seen that brake lever 138 is urged to follow such clockwise movement of brake operating lever 136 by a tension spring 147 connected between lever 138 and arm 136b. A limit screw 148 extends threadably through a tapped hole in a tab 149 depending from a side edge of lever 138, and such limit screw 148 is engageable, at its end, against an abutment or lug 150 provided at the free end of lever arm 136b for adjustably limiting the angular displacement of brake lever 138 relative to operating lever 136 under the urging of spring 147. Finally, a brake pad or shoe 151 is mounted at the free end of brake lever 138 for frictional braking engagement with the circumferential surface of boss 88 on tone arm support shaft 29, for example, as shown on FIGS. 7B, 7D and 7E when brake operating lever 136 is turned in the clockwise direction against the force of spring 139. It will be apparent that the adjustment of limit screw 148 determines the initial angular position of brake lever 138 relative to operating lever 136, is thus effective to regulate the braking force applied by brake shoe or pad 151 to collar or boss 88 when brake operating lever 136 is angularly displaced in the closkwise direction by roller 144 on main lever 47 for applying the brake mechanism, that is, engaging brake pad 151 with boss 88.

It is further to be noted that, when control gear 53 is in its stop position (FIG. 7A), the force of spring 139 acting on lever 136 causes oblique end surface 145 of lever arm 136a to apply a force $F_1$ to roller 144 which is directed to urge main lever 47 in the counterclockwise direction about pivot 79. As a result of the urging of lever 47 in the counterclockwise direction cam follower roller 81 is pressed into the inverted cusp or depression 57d defined in the inner wall surface of cam groove 57, whereby to prevent inadvertent movement of control gear 53 from its stop position in which toothless gap 56a faces pinion 52. On the other hand, when control gear 53 is in its play position (FIG. 7C), the force of spring 139 acting on lever 136 causes side surface 146 of lever arm 136a to exert a force $F_2$ on engaged roller 144, which force $F_2$ is directed to urge main lever 47 in the clockwise direction. Such clockwise urging of main lever 47 presses cam follower roller 81 into the inverted cusp or depression 57c formed in the outer wall surface of cam groove 57 and thus prevents inadvertent angular displacement of control gear 53 from its play position in which the toothless gap 56b faces pinion 52. Accordingly, the engagement of lever 136 with roller 144 on main lever 47 serves the dual functions of controlling the operation of brake mechanism 50 in response to the lead-in and return movements of main lever 47, and of ensuring that control gear 53 will be immovably positioned at its stop position or at its play position until such time as the lead-in movement or return movement of control gear 53 is positively initiated by engagement of the clutch 60 or 61, respectively.

The above described record player 10 according to this invention operates as follows:

STOP CONDITION

In the stop condition of record player 10, power ON-OFF switch actuator or knob 20 is in its OFF position whereby to deenergize motor 36. Further, in the stop condition of record player 10, control gear assembly 45, actuating slide 46, main lever 47, lead-in lever 48, brake mechanism 50 and tone arm drive mechanism 51 are all in the relative positions shown on FIGS. 5A and 7A. Since vertically movable shaft 38 of arm lifter 37 rests on the horizontal surface of arm 82 of main lever 47, as shown in full lines on FIG. 4, shaft 38 is located at its raised position with the result that arm lifter 37 contacts, or is adjacent to the lower surface of tone arm 27 which is resting on arm rest 34. Further, as previously described, by reason of the force $F_1$ applied by brake operating lever 136 to roller 144 on main lever 47, cam follower roller 81 is securely urged into the inverted cusp or depression 57d in the inner wall surface of cam groove 57 for positively holding control gear 53 in its stop position with toothless gap 56a facing toward pinion 52. Thus, control gear 53 cannot be inadvertently displaced from its stop position by impacts or shocks applied to the record player, and thus control gear 53 will not be accidentally rotated by pinion 52 when motor 36 is initially energized.

FULLY AUTOMATIC OPERATION

Prior to initiating fully automatic operation of record player 10, record size selected knob 22 is turned to the position thereof corresponding to the diameter of a record R which has been placed on turntable 14 so that the respective one of stopper edge portions 126a–126c of cam member 117 is disposed at the operative position $P_1$ on FIG. 14. With the record player in its stop condition, the manipulation of power ON-OFF switch actuator 20 to its ON position merely supplies power to the circuits (not shown) of the record player. However, motor 36 remains denergized, and hence turntable 14 remains at rest, until start-stop switch actuator 18 is manipulated or touched to initiate an automatic operation of the record player.

LEAD-IN OPERATION

Upon such manipulation of switch actuator 18, motor 36 is energized for rotating driving shaft 15 and turntable 14 at a predetermined speed in the direction of the arrow c on FIG. 2. The manipulation or touching of switch actuator 18 further causes the momentary energizing of electromagnet 77 for attracting the vertical portion 46c of actuating slide 46 and thereby displacing the latter in the direction of actuating slide 46, projection 46e at the end of horizontal slide portion 46a acts against projection 60e or clutch mechanism 60 for displacing the latter to its engaged position shown in full lines on FIG. 18. In such engaged position of clutch mechanism 60, the free end of its arm 60a is urged against the rim 52b at the top of pinion 52 so as to be interposed in the path of movement of abutment 52a with pinion 52. Accordingly, as abutment or nose 52a rotates in the direction of the arrow c on FIG. 18 with pinion 52 on driving shaft 53 such abutment 52a comes into engagement with the end of arm 60a and pushes the latter longitudinally in the direction of the arrow e (FIG. 18). The resulting incremental rotation of control gear 53 in the direction of the arrow f is sufficient to displace toothless gap 56a away from pinion 52 and to cause meshing engagement of the latter with teeth 55a. Upon the engagement of teeth 55a with pinion 52, drive gear 53 is rotated in the direction of arrow f through an angular displacement of 180°. During such angular displacement or lead-in movement of control gear 53, pin 59a depending therefrom moves against one of the sloping or slanting flanks of V-shaped projection 46e on actuating slide 46 to exert a cam action on the latter for returning the slide 46 to its inoperative position shown in broken lines on FIGS. 18 and 21. It will be noted that, by the time pin 59a is thus effective to return slide 46 to its inoperative position, electromagnet 77 is deenergized. During the lead-in movement of control gear 53 through the angular extent of 180°, depression or inverted cusp 57d moves away from cam follower roller 81 and the latter is guided by cam groove portion 57a (FIG. 7B) until, at the completion of the lead-in movement of gear 53, roller 81 engages inverted cusp or depression 57c (FIG. 7C). Further, at the start of the lead-in movement of control gear 53, switch $SW_1$ is actuated by the radially raised cam portion 58a for electrically detecting the lead-in operation of the record player.

During the guiding of cam follower roller 81 by cam groove portion 57a in the course of the lead-in movement of control gear 53, roller 81 is displaced in the direction of the arrow g away from shaft 54 (FIG. 7B) so as to effect angular displacement of lead-in movement of main lever 47 in the direction of the arrow h (FIG. 7B) from the position shown on FIG. 7A to the position shown on FIG. 7C.

It is to be noted that the lead-in movement of tone arm 27 to the set-down position predetermined by the setting or record size selecting mechanism 49 is completed prior to the arrival of main lever 47 at the extreme or play position shown on FIG. 7C. More particularly, as main lever 47 is turned in the direction of the arrow h from the position thereof shown on FIG. 7A, the flank 101a of nose 101 on hooked lead-in drive member 94 on lever 47 is moved against coupling pin 109 on lead-in lever 48 (FIG. 7B) so that lead-in lever 48 is thereafter urged to move with main lever 47 in the direction of arrow h. As lead-in lever 48 is moved with main lever 47 in the direction of the arrow h on FIG. 7B, forwardly directed extension 48a of the lead-in lever engages pin 92 on upper sector-shaped member 86 for turning the latter in the clockwise direction about the axis of shaft 29. Such turning of upper sector-shaped member 86 is transmitted to lower sector-shaped member 87 which is fixed relative to shaft 29 through the engagement of tab 86b on member 86 with limit screw 91 carried by member 87. Thus, so long as lead-in lever 48 is turned with main lever 47 in the direction of arrow h on FIG. 7B, tone arm support shaft 29 is turned in the direction to effect lead-in movement of tone arm 27, an indicated by the arrow i on FIG. 2. During such lead-in movement of tone arm 27, the latter slides on the elevated arm lifter 37 and thus is in its raised position shown in full lines on FIG. 4 and the needle or stylus 33 is spaced from the record R as it moves inwardly over the latter.

Upon completion of a predetermined lead-in movement of tone arm 27 established by the previous setting of record size selecting knob 22, abutment member 127 on lead-in lever 48 engages the one of the stopper edge portions 126a–126c of record size selecting cam member 117 then disposed at the operative position, for example, the stopper edge portion 126b as shown on FIG. 7B, so as to prevent further movement of lead-in lever 48 with main lever 47 in the direction of arrow h. Thereafter, during further movement of main lever 47 in the direction of arrow h, the angled flank 101a of nose 101 on drive member 94 and then the angled flank 101b cams across coupling pin 109 while drive member 94 is yieldably urged against pin 109 by the force of spring 97 until finally nose 101 is released from coupling pin 109 and the lead-in movement of main lever 47 can continue independently of lead-in lever 48. As main lever 47 continues to turn in the direction of arrow h on FIG. 7B, for example, to the play position shown on FIG. 7C, downwardly inclined ramp 84 of main lever 47 moves under shaft 38 so as to permit gravitationally induced downward movement of shaft 38 and of arm lifter 37 therewith so that tone arm 27 is lowered to the position shown in broken lines on FIG. 4 and needle or stylus 33 engages record R at the previously predetermined setdown position. Upon such engagement of the needle or stylus 33 with record R, the lead-in operation of record player 10 is completed and a play operation thereof is commenced.

It will be seen that, during the camming of flank 101b on nose 101 across coupling pin 109 in the course of the above described release of nose 101 from pin 109, spring 97 acting on lead-in drive member 94 provides a component of force on coupling pin 109 which causes counter-clockwise displacement of lead-in lever 48 in the direction of arrow $h'$ on FIG. 7B, for example, to the position indicated in broken lines at 48'. By reason of such counter-clockwise displacement of lead-in lever 48, the extension 48a of the latter is separated from pin 92 on upper sector-shaped member 86. Therefore, when needle or stylus 33 is engaged with the groove of record R at the commencement of the play operation, lead-in lever 48 is already separated from pin 92 and will not restrain swinging movement of tone arm 27 in the outward direction indicated by the arrow $i'$ on FIG. 2, as might be caused by eccentricity of the sound groove in record R. Accordingly, during the play operation, and particularly at the commencement thereof, needle or stylus 33 is free to precisely follow the sound groove of record R and there is no danger that either the needle or sound groove will be damaged as a result of restraints on the movement of the needle.

As main lever 47 attains its play position at the completion of the lead-in movement thereof, pin 115 depending from main lever 47 actuates switch $SW_2$ so that the latter electrically detects the commencement of a play operation. Furthermore, as main lever 47 nears its play position, abutment 105 of return drive member 95 is engaged with projection 108 of the chassis for causing angular displacement of return drive member 95 from its retracted position and permitting toggle spring 106 to complete the movement of drive member 95 to its extended position, as shown on FIG. 5B. At the completion of the lead-in movement or turning of control gear 53 through 180° from the stop position of FIGS. 5A and 7A to the play position of FIGS. 5B and 7C, the actuator of switch $SW_1$ moves from the raised portion 58a to the depressed portion 58b of radial cam 58 so as to electrically detect the completion of the lead-in operation. By reason of the direction of the force $F_2$ (FIG. 7C) applied to main lever 47 by brake operating lever 136 under the influence of spring 139, main lever 47 is urged in the direction for pressing cam follower roller 81 thereon into the inverted cusp or depression 57c in the outer wall surface of cam groove 57 for positively holding control gear 53 in its play position with toothless gap 56b facing toward pinion 52. Thus, upon completion of the lead-in operation, control gear 53 cannot be inadvertently displaced from its play position by impacts or shocks applied to the record player and, therefore, will not be accidentally rotated by pinion 52 during the following play operation.

It is to be noted that during the lead-in operation of record player 10, a suitable braking force is applied by brake mechanism 50 to the collar or boss 88 on tone arm support shaft 29 so that the lead-in movement of tone arm 27 to its predetermined set-down position is smoothly effected.

Furthermore, in the described record player 10, the tone arm drive mechanism 51 ensures that none of the parts of automatic control mechanism 44 will be damaged in the event that an unexpected force is applied to tone arm 27 in the direction of the arrow $i$ or in the direction of the arrow $i'$ on FIG. 2, for example, by the hand of the user, during the lead-in operation. In the event that such unexpected force urges tone arm 27 to swing inwardly in the direction of the arrow $i$, pin 92 on upper sector-shaped member 86 merely moves away from the forwardly directed extension 48a of lead-in lever 48, while lead-in lever 48 and main lever 47 continue their lead-in movements at the controlled rate determined by cam 57 of control gear 53. During such inadvertent manual displacement of tone arm 27 in the direction of the arrow $i$, there is no danger that the needle or stylus 33 will drop onto record R, and thereby damage either the needle or record groove, as tone arm 27 continues to be held in its raised position shown in full lines on FIG. 4 by arm lifter 37 until main lever 47 has completed its lead-in movement so as to bring downwardly inclined ramp 84 of main lever 47 under the arm lifter shaft 38.

In the event that the force applied manually to tone arm 27 during the lead-in operation is in the direction of the arrow $i'$ on FIG. 2, that is, in the direction to resist the lead-in movement of the tone arm, the movement of pin 92 on upper sector-shaped member 86 in the direction of the arrow $h$ on FIG. 7B is blocked so as to stop the lead-in movement of lead-in lever 48 with main lever 47. As a result of the foregoing, the angled flank 101a of nose 101 on drive member 94 cams across coupling pin 109 against the resistance of spring 97 to turning of lead-in drive member 94 and nose 101 is released from coupling pin 109. Accordingly, the lead-in movement of tone arm 27 is safely stopped at the position where the manual force opposing such movement is applied to the tone arm while main lever 47 is free to continue its lead-in movement to the play position shown on FIG. 7C. After the lead-in movement of tone arm 27 has been inadvertently halted by a force applied manually thereto, the tone arm can be manually swung inwardly to the desired set-down position at which needle or stylus 33 will be lowered into engagement with record R when main lever 47 attains its play position so as to bring inclined ramp 84 under arm lifter shaft 38.

It will be appreciated that, when main lever 47 is in its stop position (FIG. 5A) and throughout the lead-in movement of main lever 47 to its play position at which projection 108 on chassis 35 engages abutment 105 of return drive member 95 for initiating displacement of the latter to its extended position, as previously described, return drive member 95 is held in its retracted position by toggle spring 106 so as to avoid interference with the movement of pin 92 on upper sector-shaped member 86. Moreover, when main lever 47 is in its play position with return drive member 95 in its extended position (FIG. 5B), the extended drive member 95 is outside the arcuate path of movement of pin 92 resulting from inward swinging of tone arm 27 in the direction of the arrow $i$ on FIG. 2. Accordingly, tone arm 27 can be manually moved in the direction of the arrow $i$ without restraint from return drive member 95 both during the lead-in operation and upon the completion of the latter, that is, during play operation of record player 10.

PLAY OPERATION

At the completion of the lead-in movement of control gear 53, that is, at the start of the play operation of record player 10, the positions of clutch mechanisms 60 and 61 are the reverse of the positions thereof in the stop condition of the record player, that is, downwardly directed projection 66b of the underlying cam member 66 of clutch mechanism 61 is adjacent the projection 46e on actuating slide 46 (FIG. 19). Further, at the commencement of the play operation, pin 93 is spaced from end 46f of actuating slide 46, as shown in full lines on FIG. 19. During the play operation, the engagement of needle 33 in the spiral groove of record R causes the progressive inward swinging of the tone arm in the direction of the arrow *i* on FIG. 19.

RETURN OPERATION

When needle 33 has reached the inner end of the spiral grooove in record R, for example, when the tone arm assembly 16 has reached the position indicated in broken lines at 16' on FIG. 19, pin 93 on upper sector-shaped member 86 moves to the position indicated in broken lines at 93' and acts against the adjacent end 46*f* of actuating slide 46 for displacing the latter in the direction of the arrow *d*. As a result of such displacement of actuating slide 46, projection 46*e* at the end thereof acts against projection 66*b* of underlying cam member 66 for turning the latter in the counterclockwise direction about pivot pin 67. Due to the frictional engagement of engaging member 65 with cam member 66, engaging member 65 is turned with the underlying cam member 66, for establishing the engaged condition of clutch mechanism 61, for example, as indicated in broken lines at 61' on FIG. 19. In such engaged condition of clutch mechanism 61, the free end of arm 65*a* of engaging member 65 projects above toothless gap 56*b* of control gear 53 against the rim 52*b* at the top of pinion 52 so as to be interposed in the path of movement of abutment 52*a*. Accordingly, as abutment or nose 52*a* rotates with pinion 52 in the direction of arrow *c* on FIG. 19, abutment 52*a* comes into engagement with the end of arm 65*a* and pushes the latter longitudinally to effect an incremental rotation of control gear 53 in the direction of the arrow *f*. Such incremental rotation of gear 53 is sufficient to displace toothless gap 56*b* away from pinion 52 and to cause meshing engagement of the latter with teeth 55*b*. Upon the engagement of teeth 55*b* with pinion 52, control gear 53 is rotated in the direction of arrow *f* through an angular displacement of 180° for effecting a return operation of control mechanism 44. During such half-revolution or return movement of control gear 53, pin 59*b* depending therefrom moves against one of the sloping or slanting flanks of V-shaped projection 46*e* on actuating slide 46 for returning the slide to its inoperative position indicated in full lines on FIG. 19.

Figure 8A:
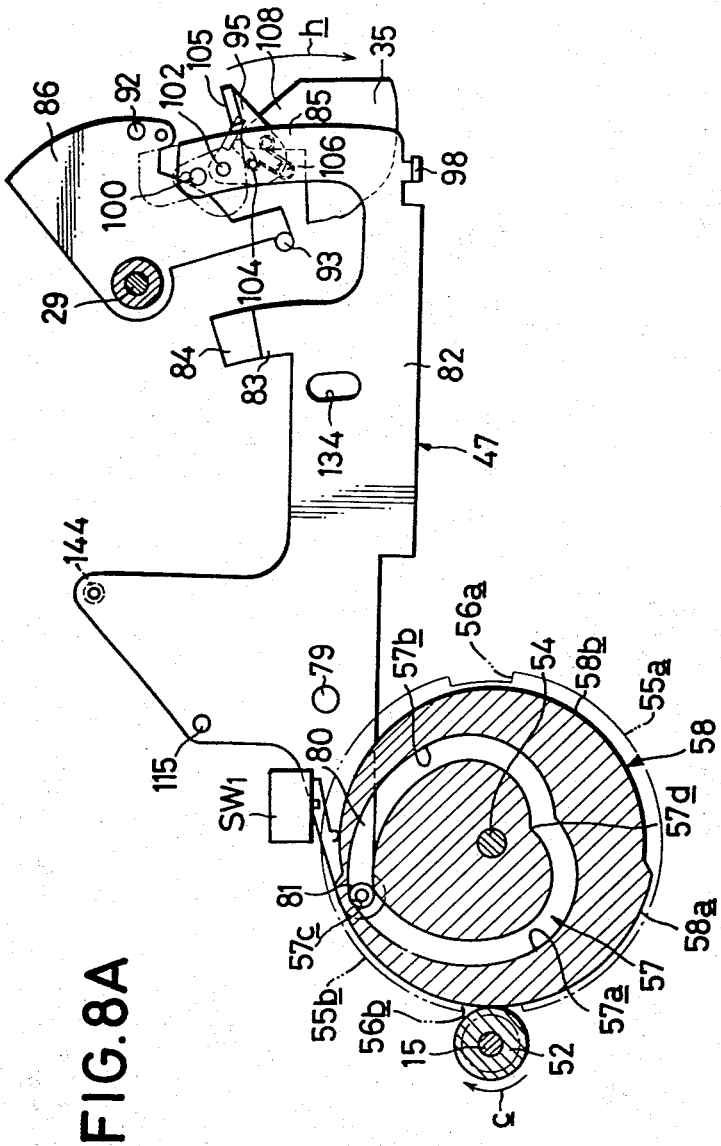
FIGS. 8A–8C are plan views illustrating the operation of a return drive member of a tone arm drive mechanism in several positions of the control gear.
Figure 8B:
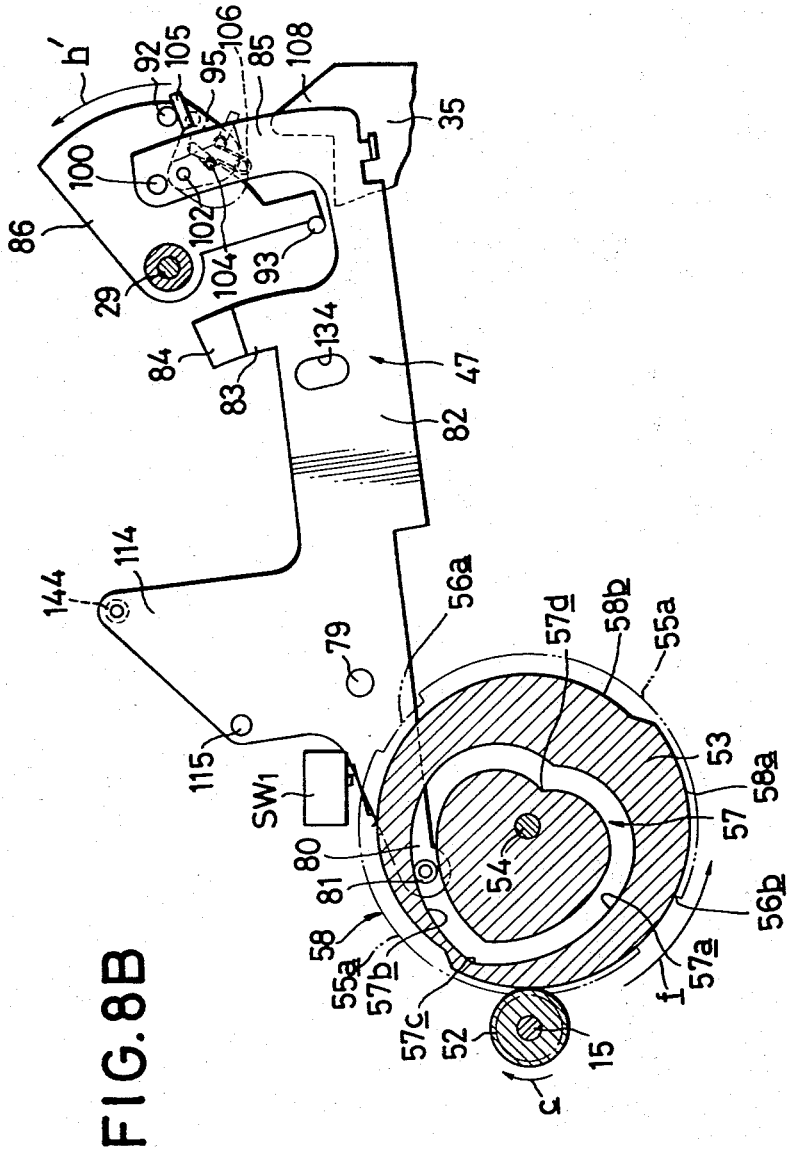
Figure 8C:
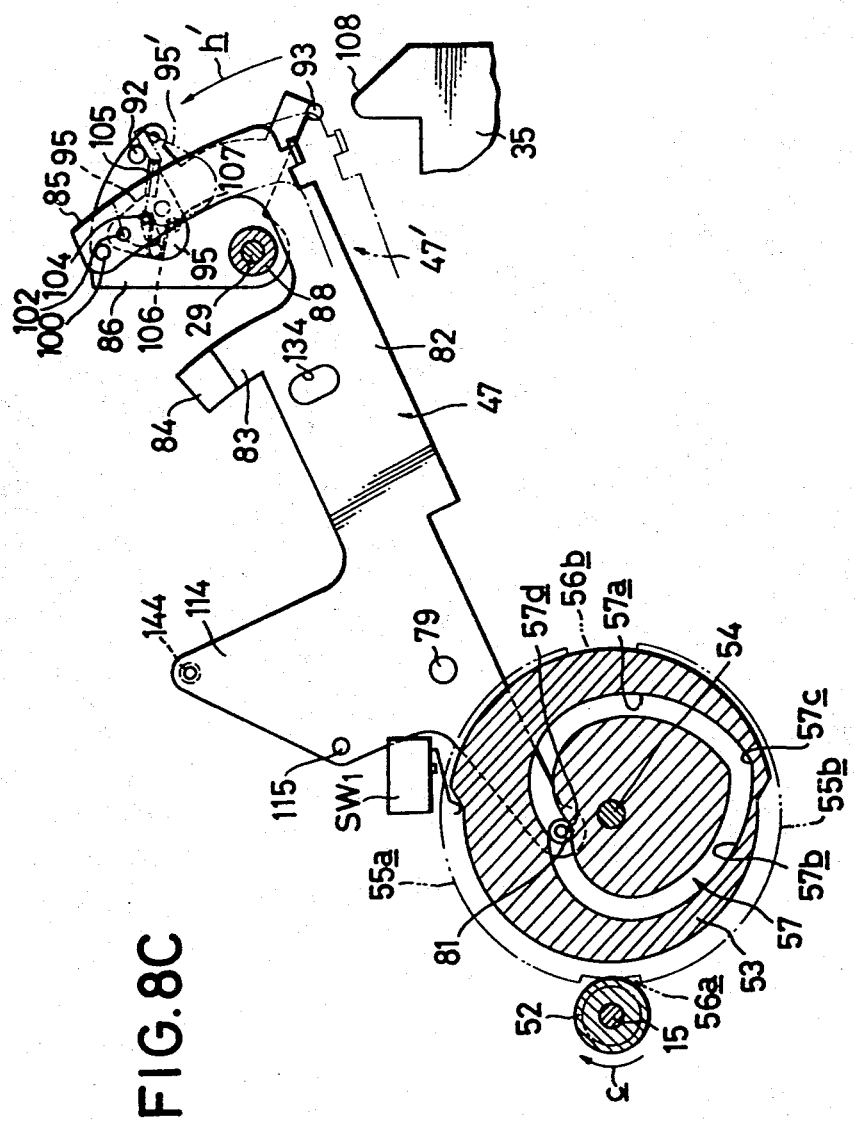

During the return movement of control gear 53, depression or inverted cusp 57*c* moves away from cam follower roller 81 and the latter is guided by cam groove portion 57*b* (FIG. 7D) until, at the completion of the return movement of gear 53, roller 51 again engages inverted cusp or depression 57*d* (FIG. 8C). During the guiding of cam follower roller 81 by cam groove portion 57*b* in the course of the return movement of control hear 53, roller 81 is displaced in the direction toward shaft 54 so as to effect angular displacement or return movement of main lever 47 in the direction of the arrow *h'* (FIG. 7D) from the position shown on FIG. 7C to the position shown on FIG. 8C. At the commencement of such return movement of main lever 47 in the direction of the arrow *h'*, pin 115 on main lever 47 is separated from the actuator of play detecting switch SW₂ so as to electricallyindicate that the play operation has been terminated. Further, at the commencement of the return movement of main lever 47, inclined ramp 84 on main lever 47 moves out from under arm lifter shaft 38 so that the latter is raised and thereafter supported on the horizontal portion of main lever 47, with the result that arm lifter 37 is raised for lifting tone arm 27 and separating needle 33 from the record R during the return operation. As the return movement of main lever 47 is continued, abutment 105 of return drive member 95 in its extended position engages pin 92 on upper sector-shaped member 86 so as to push that pin 92 in the direction of the arrow *h'* on FIG. 8B. Thus, sector-shaped member 86 is turned in the counter-clockwise direction about tone arm support shaft 29 and the lower sector-shaped member 87 is made to follow such turning movement of member 86 through the connecting spring 90, with the result that tone arm 27 is made to swing outwardly in the direction of the arrow *i'* on FIG. 2 while being held in its raised position on arm lifter 37.

During the return movement of main lever 47 in the direction of the arrow *h'* on FIG. 7D, the angled flank 101*b* on nose 101 of drive member 94 acts against coupling pin 109 on lead-in lever 48 for similarly turning the lead-in lever in the direction of the arrow *h'* about pivot pin 79.

The several parts of control mechanism 44 are dimensioned and arranged so that the return swinging movement of tone arm 27 to its rest position on arm rest 34 is completed prior to the completion of the return movement of control gear 53, for example, at a time when control gear 53 is in the position shown on FIG. 7E. When control gear 53 attains the position shown on FIG. 7E, pin 109 on lead-in lever 48 engages abutment 110 of the chassis so as to prevent further return swinging movement of lead-in lever 48. Therefore, during the final return movement of control gear 53 to the stop position indicated on FIG. 8C, nose 101 of drive member 94 cams over coupling pin 109 so as to be again engaged in back of the latter, as indicated in broken lines on FIG. 7E. Further, during the final return movement of control gear 53, for example, from the position shown on FIG. 7E to the stop position shown on FIG. 8C, that is, during the final return movement of main lever 47 from the position shown in broken lines at 47' on FIG. 8C to the position shown in full lines thereon, additional turning of upper sector-shaped member 86 is blocked by the engagement of tone arm 27 with arm rest 34 and, therefore, movement of pin 92 by abutment 105 of return drive member 95 is arrested. Accordingly, during movement of the main lever from the position indicated in broken lines at 47' to the position shown in full lines on FIG. 8C, pin 92 reacts against abutment 105 of return drive member 95 for displacing the latter from its extending position indicated in broken lines at 95' to its retracted position where it is thereafter held by toggle spring 106.

During the final return movement of control gear 53 back to its stop position shown on FIG. 5A, clutch mechanism 60, which has been in its engaged position since initiation of the previously described lead-in operation, is returned to its disengaged position. Such return of clutch mechanism 60 from its engaged position to its disengaged position is effected by the movement of its projecting cam portion 60*d* across the periphery of drive gear 52. Accordingly, when control gear 53 returns to its original or stop position in which toothless gap 56*a* faces towards drive gear 52, nose or abutment 52*a* can rotate with drive gear or pinion 52 without engaging arm 60*a* of clutch mechanism 60. Further, upon the return movement of control gear 53 to its stop position (FIG. 7A) inverted cusp or depression 57*b* of cam 57 is again located at cam follower roller 81 and the latter is pressed into such inverted cusp or depression by the force $F_1$ applied to main lever 47 from brake control lever 136 so that control gear 53 is again held securely against inadvertent displacement from its stop position.

It is also to be noted that, during the above described return operation, brake mechanism 50 applies a braking force to collar or boss 88 on tone arm support shaft 29 for braking the return movement of tone arm 27 to its rest position.

It will be seen that the control mechanism 44 is constructed and arranged to prevent any damage to its several parts in the event that, during the described return operation thereof, an unexpected force is applied to tone arm 27 for example, by the hand of the user, either in the direction of the arrow $i$ or in the direction of the arrow $i'$ on FIG. 2. In the event that such unexpected force urges tone arm to swing outwardly in the return direction indicated by the arrow $i'$, pin 92 on upper sector-shaped member 86 merely moves away from the abutment 105 of return drive member 95 and the outward swinging of the tone arm is finally arrested by arm rest 34. In the event that the force applied manually to tone arm 27 during the return operation is in the direction of the arrow $i$, that is, in the direction to resist the return movement of the tone arm, the resultant blocking of the movement of pin 92 in the direction $h'$ on FIG. 8B, while main lever 47 continues its return movement, causes displacement of return drive member 95 from its extended position to its retracted position for disengaging abutment 105 from pin 92. Thus, the force applied manually in the direction of the arrow $i$ on FIG. 2 can halt the return movement of tone arm 27 while main lever 47 is free to continue its return movement to the original or stop position thereof.

REJECT OPERATION

At any time during a play operation of control mechanism 44, the start-stop switch actuator 18 may be manipulated or touched for momentarily energizing electromagnet 77 and thereby initiating a reject operation. The momentary energizing of electromagnet 77 causes displacement of actuating slide 46 in the direction of the arrow $d$ on FIG. 19 so that the end projection 46e of the actuating slide is then effective to displace clutch mechanism 61 to its engaged position as has been described above in connection with the initiation of a return operation. Following such movement of clutch mechanism 61 to its engaged position, the reject operation proceeds in the same manner as the return operation, so that tone arm 27 is returned to its rest position on arm rest 34 and the several parts of control mechanism 44 are returned to the positions thereof shown on FIG. 5A.

MANUAL OPERATION

When it is desired to effect manual operation of record player 10, knob 22 is set to the position for manual operation so as to dispose stopper edge portion 126d of cam member 117 at the operative position $P_1$ on FIG. 14. With control mechanism 44 in its stop condition, arm lifter 37 is held in its raised position by the engagement of its support shaft 38 with the horizontal portion of main lever 47, and tone arm 27 is manually displaced inwardly in the direction of the arrow $i$ on FIG. 2 to the desired set-down position. During such manual displacement of tone arm 27, the latter slides across raised arm lifter 37 so that needle 33 is elevated in respect to record R on turntable 14. Since return drive member 95 is in its retracted position when control mechanism 44 is in its stop condition (FIG. 5A), the abutment 105 of drive member 95 is spaced inwardly in respect to the arcuate path of movement of pin 92 about tone arm support shaft 29 so as to avoid interference with the described manually effected inward swinging of the tone arm to the desired set-down position.

After having manually located tone arm 27 at the desired set-down position, start-stop switch actuator 18 is manipulated or touched so that, as in the previously described lead-in operation, electromagnet 77 is momentarily energized to displace actuating slide 46 in the direction of the arrow $d$ on FIG. 18 for engaging clutch mechanism 60. Thus, turning of control gear 53 through a half revolution from the position of FIG. 5A to the position of FIG. 5B is initiated for effecting corresponding swinging of main lever 47. However, when manual operation has been selected, the engagement of abutment 127 on lead-in lever 48 with stopper edge portion 126d on size-selecting cam member 117 prevents substantial movement of lead-in lever 48 away from its stop position on FIG. 5A. Therefore, as main lever 47 is turned in the direction of the arrow $h$ on FIG. 7B, lead-in lever 48 remains in its stop position and lead-in drive member 94 has its nose 101 disengaged from coupling pin 109 on the lead-in lever. When main lever 47 arrives at its play position (FIG. 7C), downwardly inclined ramp 84 moves under shaft 38 so as to permit gravitationally induced downward movement of shaft 38 and of arm lifter 37 thereon so that tone arm 27 is lowered and the needle or stylus 33 engages record R at the previously manually selected set-down position. Upon such engagement of needle of stylus 33 with record R, the play operation of record player 10 commences.

If desired, during manual operation, the vertical movements of arm lifter 37, and hence the lowering of tone arm 27 for engaging needle or stylus 33 with record R at a previously manually selected set-down position may be controlled by the manually actuable cueing control handle 40. In other words, handle 40 may be initially disposed to maintain arm lifter 37 in its raised position even when main lever 47 attains its play position (FIG. 5B) with inclined ramp 84 under shaft 38. Thereafter, when it is desired to initiate the play operation, handle 40 is manipulated to lower shaft 38 and arm lifter 37, and thereby cause engagement of the needle or stylus with the record.

During the above described manual operation of record player 10, the return operation of control mechanism 44 and/or the reject operation thereof may occur in the same manner as has been previously described with respect to the fully automatic operation of the record player.

It is to be particularly noted that, during a normal lead-in operation of the above described control mechanism 44 according to this invention, nose 101 of lead-in drive member 94 is disengaged from coupling pin 109 on lead-in lever 48 when tone arm 27 has reached the selected set-down position. Moreover, in the course of such disengagement of nose 101 from coupling pin 109, spring 97 acting on lead-in drive member 94 causes nose 101 to effect a slight reverse angular displacement of lead-in lever 48 in the direction of arrow $h'$ on FIG. 7B so that extension 48a is separated from pin 92. By reason of the foregoing, as previously described, needle or stylus 33, when engaged with the groove of record R at the commencement of a play operation, is free to track the record groove without restraint from the tone arm drive mechanism 51.

By reason of the foregoing features of control mechanism 44 according to this invention, the user enjoys considerable freedom in the operation of the record player without fear that handling of the tone arm, either by accident or design, during the automatic lead-in and return operations will cause damage to the control mechanism. Moreover, although the record player 10 including the described control mechanism 44 can effect fully automatic lead-in and control operations, such control mechanism 44 does not impose any restraints on the tracking of the record groove by the needle or stylus 33 whereby to avoid any undue wear of the stylus or record.

Although on illustrative embodiments of the invention has been described in detail herein, it will be understood that the invention is not limited to that precise embodiment, and that various changes and modifications may be effected therein by one skilled in the art without departing from the scope or spirit of the invention as defined in the appended claims.

What is claimed is:

1. In a phonograph record player having a rotatable turntable for supporting a phonograph record during the playing thereof, drive means for rotating said turntable, and a tone arm assembly including a tone arm carrying a pickup with a stylus to track the groove of a phonograph record on said turntable during a play operation and being mounted for lateral swinging across said turntable and for raising and lowering of the tone arm relative to said turntable: a control mechanism operative in a lead-in mode for effecting lead-in movement of said tone arm from an elevated rest position outside the perimeter of said turntable to a selected set-down position of said stylus on a record supported by said turntable so as to commence a play operation, and in a return mode for effecting a return movement of said tone arm to said rest position upon the termination of said play operation, said control mechanism comprising a drive gear rotatable by said drive means;

a control gear having a cam groove therein and being turned by said drive gear in said lead-in and return modes of operation;

a main lever having a cam follower engaging said cam groove for effecting swinging movements of said lever in first and second directions in response to the turning of said control gear in said lead-in and return modes of operation, respectively;

tone arm drive means for effecting swinging of said tone arm in said lead-in and return movements in response to said swinging movements of said main lever in said first and second directions, respectively, said tone arm drive means including an engaging member coupled with said tone arm assembly for swinging of said tone arm upon movement of said engaging member in an arcuate path, a lead-in lever pivoted for swinging movements both with, and in respect to said main lever and being movable against said engaging member for moving the latter in one direction in said arcuate path upon swinging movement of said lead-in lever with said main lever in said first direction, return drive means on said main lever movable against said engaging member for moving the latter in the opposite direction in said arcuate path upon swinging movement of said main lever in said second direction, a coupling pin on said lead-in lever spaced from, and extending parallel to the axis of said swinging movements of the lead-in lever, a lead-in drive member pivoted at one end on said main lever for movement with the latter and for angular displacement of said lead-in drive member relative to said main lever about an axis parallel to the axis of said swinging movements of the main lever, said lead-in drive member extending from said axis of its angular displacement generally in said second direction of the swinging movement of said main lever and having a substantially triangular nose extending from one side of the free end portion of said lead-in drive member, said nose having oppositely angled first and second flanks facing generally in said first and second directions, respectively, of said swinging movements of the main lever, and spring means acting on said lead-in drive member to urge the latter to be angularly displaced in the direction moving said one side against said coupling pin so that said first and second flanks of said nose are engageable with said coupling pin to cause swinging movements of said lead-in lever with said main lever in said first and second directions, respectively; and stop means for limiting the swinging movement of said lead-in lever with said main lever in said first direction, whereupon said first flank cams over said coupling pin and said second flank engages the coupling pin and under the influence of said spring means causes incremental swinging of said lead-in lever in said second direction to separate said lead-in lever from said engaging member when said stop means establishes the set-down position of said stylus on a record by said limiting of the movement of said lead-in lever in said first direction.

2. A phonograph record player according to claim 1; in which said return drive means includes a return drive member movable with respect to said main lever, at the end of said swinging movement of the latter in said first direction, to an extended position for projecting across said arcuate path and, at the end of said swinging movement of said main lever in said second direction, to a retracted position withdrawn from said arcuate path; and toggle spring means acting on said return drive member for yieldably holding the latter in either of said extended and retracted positions and being overcome by said predetermined resistance to swinging of said tone arm in said return movement of the latter for causing said engaging member to change-over said return drive member from said extended position to said retracted position.

3. A phonograph record player according to claim 1; further comprising means limiting said return swinging of said lead-in lever prior to the completion of said swinging movement of said main lever in said second direction so that, during the final swinging movement of said main lever in said second direction, said second flank of the nose cams over said coupling member for reengaging said nose therewith.

* * * * *